(12) United States Patent
Kamemizu et al.

(10) Patent No.: US 7,306,277 B2
(45) Date of Patent: Dec. 11, 2007

(54) ARTICLE STORAGE STRUCTURE FOR SCOOTER-TYPE VEHICLE

(75) Inventors: Fuminori Kamemizu, Wako (JP); Susumu Michisaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 10/966,171

(22) Filed: Oct. 4, 2004

(65) Prior Publication Data

US 2005/0155804 A1 Jul. 21, 2005

(30) Foreign Application Priority Data

Oct. 10, 2003 (JP) ............................ 2003-352969

(51) Int. Cl.
*B60R 7/06* (2006.01)
*B62H 5/06* (2006.01)

(52) U.S. Cl. ....................... 296/37.1; 70/233

(58) Field of Classification Search ............... 296/37.1, 296/78.1; 224/413; 70/233, 252, 258
See application file for complete search history.

(56) References Cited

U.S. PATENT DOCUMENTS

| | | | | |
|---|---|---|---|---|
| 4,278,285 A | * | 7/1981 | Cummings et al. | 296/78.1 |
| 4,441,574 A | * | 4/1984 | Kohyama et al. | 180/219 |
| 4,473,251 A | * | 9/1984 | Murayama | 296/78.1 |
| 4,522,442 A | * | 6/1985 | Takenaka | 296/37.1 |
| 4,619,476 A | * | 10/1986 | Kawasaki | 296/37.1 |
| 4,697,842 A | * | 10/1987 | Kawasaki | 296/78.1 |
| 4,807,919 A | * | 2/1989 | Ito | 296/37.1 |
| 4,895,284 A | * | 1/1990 | Nogami et al. | 224/413 |
| 4,907,428 A | | 3/1990 | Nakashima et al. | |
| 5,291,067 A | | 3/1994 | Nakajima et al. | |
| 5,303,795 A | * | 4/1994 | Buell | 180/219 |
| 6,249,744 B1 | | 6/2001 | Morita | |
| 6,979,039 B2 | * | 12/2005 | Takemura et al. | 296/78.1 |
| 7,219,939 B2 | * | 5/2007 | Kamemizu et al. | 296/37.1 |
| 2001/0030438 A1 | * | 10/2001 | Kamemizu et al. | 296/37.1 |
| 2003/0222473 A1 | | 12/2003 | Yamamoto et al. | |
| 2004/0195855 A1 | * | 10/2004 | Takeshima | 296/37.1 |

FOREIGN PATENT DOCUMENTS

| | | | | |
|---|---|---|---|---|
| EP | 1520968 | | 4/2005 | |
| FR | 2802889 | | 6/2001 | |
| JP | 02128971 A | * | 5/1990 | 296/37.1 |
| JP | 03217384 A | * | 9/1991 | 296/37.1 |
| JP | 03246180 A | * | 11/1991 | 296/37.1 |
| JP | 05139354 A | * | 6/1993 | 296/78.1 |
| JP | 9-11952 | | 1/1997 | |
| JP | 09151642 A | * | 6/1997 | 70/233 |
| JP | 10001079 | | 1/1998 | |
| JP | 11-227658 | | 8/1999 | |
| JP | 2001-63657 | | 3/2001 | |
| JP | 2001-260968 | | 9/2001 | |
| JP | 2001-278154 | | 10/2001 | |
| JP | 2003-285692 | | 10/2003 | |

* cited by examiner

*Primary Examiner*—D. Glenn Dayoan
*Assistant Examiner*—Paul Chenevert
(74) *Attorney, Agent, or Firm*—Hamre, Schumann, Mueller & Larson, PC

(57) ABSTRACT

A scooter-type vehicle capable of accommodating articles in a legshield covering from the rear side a head pipe, steerably supporting a front wheel and a steering handle, to accommodate articles by effectively using a space of the legshield.

3 Claims, 20 Drawing Sheets

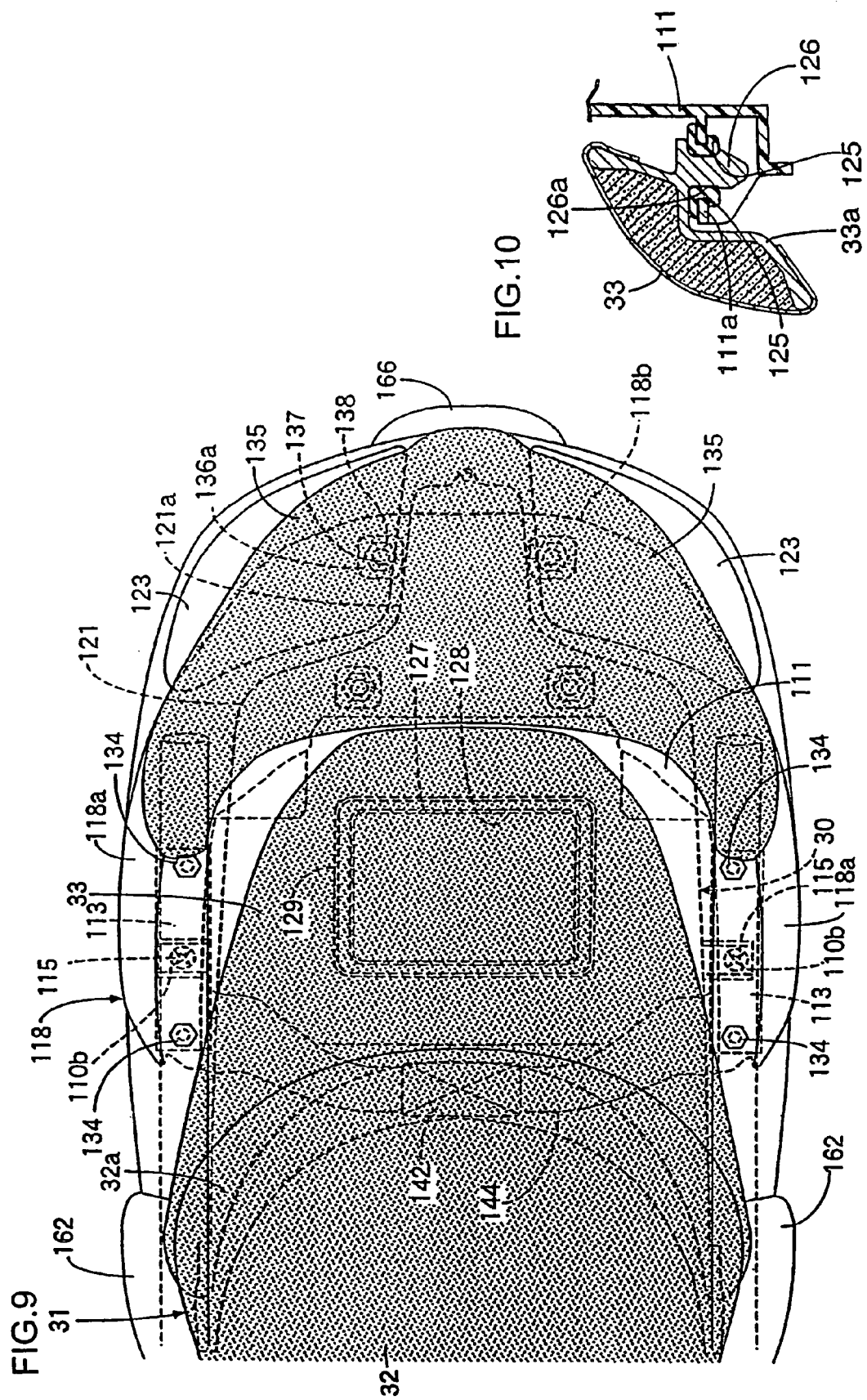

ARTICLE STORAGE STRUCTURE FOR SCOOTER-TYPE VEHICLE

FIELD OF THE INVENTION

The present invention relates to an article storage structure for a scooter-type vehicle which is capable of accommodating articles in a legshield covering a head pipe from the rear side. Herein, the head pipe steerably supports a front wheel and a steering handle.

BACKGROUND OF THE INVENTION

A scooter-type vehicle including an article storage section arranged in a legshield has been disclosed in Japanese Patent Laid-Open No. 9-11952. In the article storage section, a storage recess portion formed in the legshield is covered with a lid member so as to be opened and closed.

The legshield includes comparatively large spaces in the right and left of the head pipe. The aforementioned conventional one is far from effectively utilizing these spaces.

The present invention was made in the light of such a circumstance, and an object of the present invention is to provide an article storage structure for a scooter-type vehicle allowed to accommodate articles by effectively utilizing a space of the legshield.

SUMMARY OF THE INVENTION

In order to achieve the aforementioned object, an article storage structure for a scooter-type vehicle, which is capable of accommodating articles in a legshield covering a head pipe from the rear side, the head pipe steerably supporting a front wheel and a steering handle, comprises a first article storage section and a second article storage section separately placed in the legshield left and right. The first article storage section includes a storage case capable of being pulled out and removed from the legshield to be configured as a pullout type, and the second article storage section includes a storage recess portion formed in the legshield and covered with a lid member to be opened and closed, the lid member being hinged to the legshield. The storage case is formed to be larger than the storage recess portion.

By arranging the first and second article storage sections in the right and left sides of the legshield, articles can be accommodated in the legshield by effectively using a comparatively large space of the legshield. Moreover, the accommodation capacity of the first article storage section is set comparatively large, and the first article storage section can accommodate a comparatively large amount of articles. Since the first article storage section is a pullout type, articles within the storage case do not come out when the lid is opened, and it is possible to accommodate articles fully within the storage case. When the storage case is removed from the legshield, a comparatively large opening portion can be opened in the legshield, which facilitates maintenance of bulbs of headlights and the like arranged forward of the first article storage section.

Another aspect of the present invention includes a lock mechanism between the storage case of the first article storage section and the legshield, the lock mechanism being capable of switching between connection and disconnection of the storage case and the legshield according to a key operation through a keyhole positioned in an outer end of the storage case.

The storage case can be pulled by inserting a key into a keyhole of the lock mechanism in operation. It is then possible to prevent articles accommodated in the first article storage section from being stolen. Moreover, the storage case can be pulled out with the key as a grip, thus eliminating the need for the grip to be provided in the storage case. Accordingly, the first article storage section can accommodate more articles.

Further, the storage case can be formed to cover the head pipe from one of right and left sides when retracted, and the lock mechanism is arranged at a position opposite to the rear side of the head pipe.

The accommodation capacity of the storage case can be further increased by effectively arranging the lock mechanism in a space rearward of the head pipe.

A handle lock module capable of inhibiting a steering operation of the steering handle is arranged on an opposite side to the first article storage section in the vicinity of the head pipe and the second article storage section is arranged so that the handle lock module is sandwiched between the first article storage section and the second article storage section.

The first article storage section, the handle lock module, and the second article storage section are arranged in the legshield side by side, and the comparatively large space of the legshield can be used more effectively.

BRIEF DESCRIPTION OF DRAWINGS

FIG. 9 is a view in the direction of arrows 9 of FIG. 8.

FIG. 10 is an enlarged cross-sectional view taken along a line 10-10 of FIG. 1.

DETAILED DESCRIPTION OF THE INVENTION

Hereinafter, a description is given of an embodiment according to the present invention based on an example of the present invention shown in the accompanying drawings.

Figure 1:
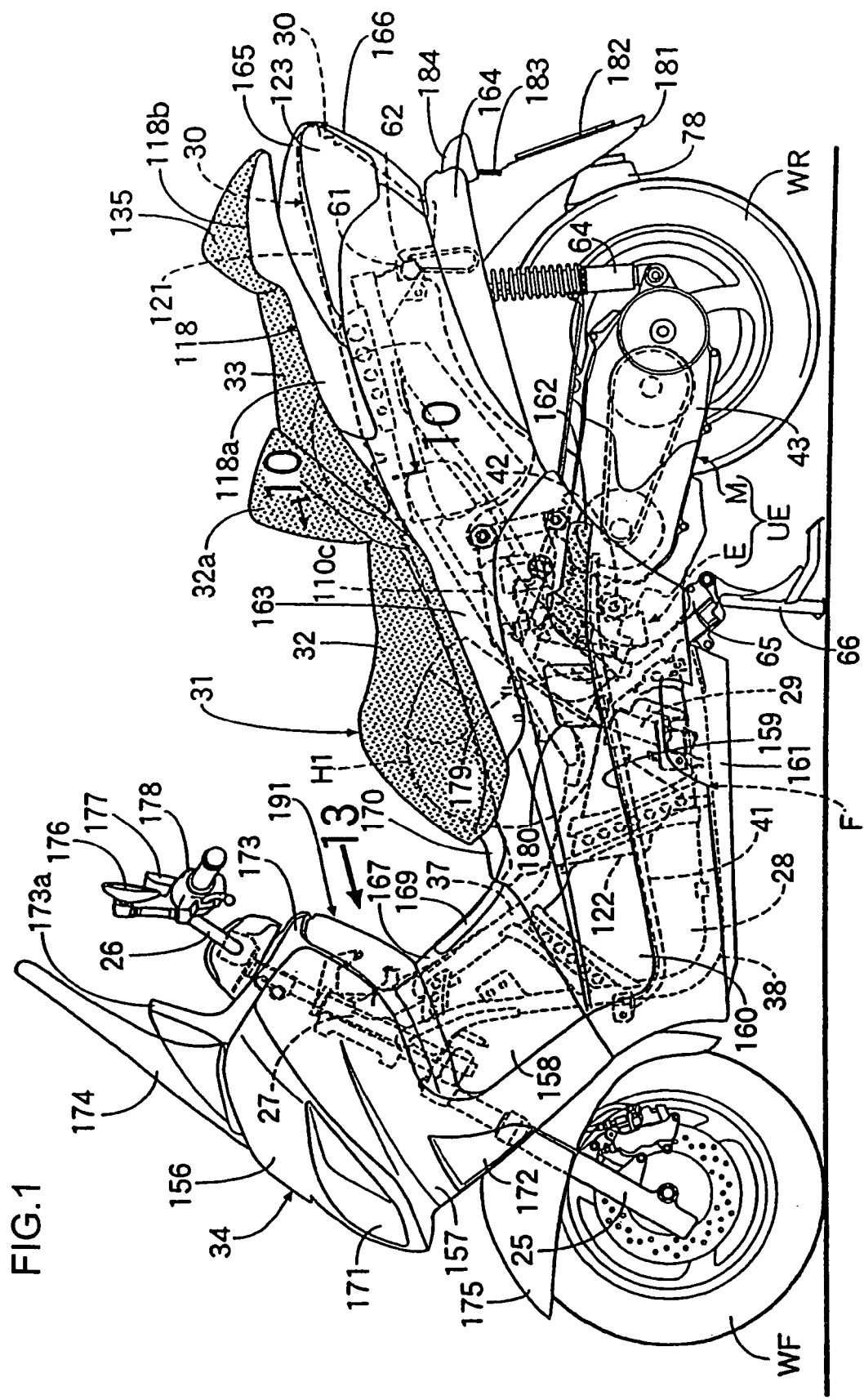
FIG. 1 is a left side view of a scooter-type vehicle.

First in FIG. 1, a vehicle body frame F of a scooter type vehicle as a motor cycle includes, at the front end, a front fork 25 supporting an axle of a front wheel WF and a head pipe 27 steerably supporting a steering handle 26 connected to the front fork 25. A swing unit engine UE supporting a rear wheel WR at the rear end is supported in the longitudinal middle portion of the vehicle body frame F so as to swing up and down. A fuel tank 28 formed so as to be long in the vertical direction when viewed from a side and a radiator 29 arranged rearward of the fuel tank 28 are mounted on the vehicle body frame F forward of the unit swing engine UE. A storage box 30 is attached to the vehicle body frame F so as to cover the unit swing engine UE from above. Over the storage box 30, a riding seat 31 is arranged, which includes front and rear seats 32 and 33 and is structured in tandem. In addition, a vehicle body cover 34 made of synthetic resin is attached to the vehicle body frame F, which covers the vehicle body frame F, the front part of the unit swing engine UE, the fuel tank 28, the radiator 29, and the storage box 30.

Figure 2:
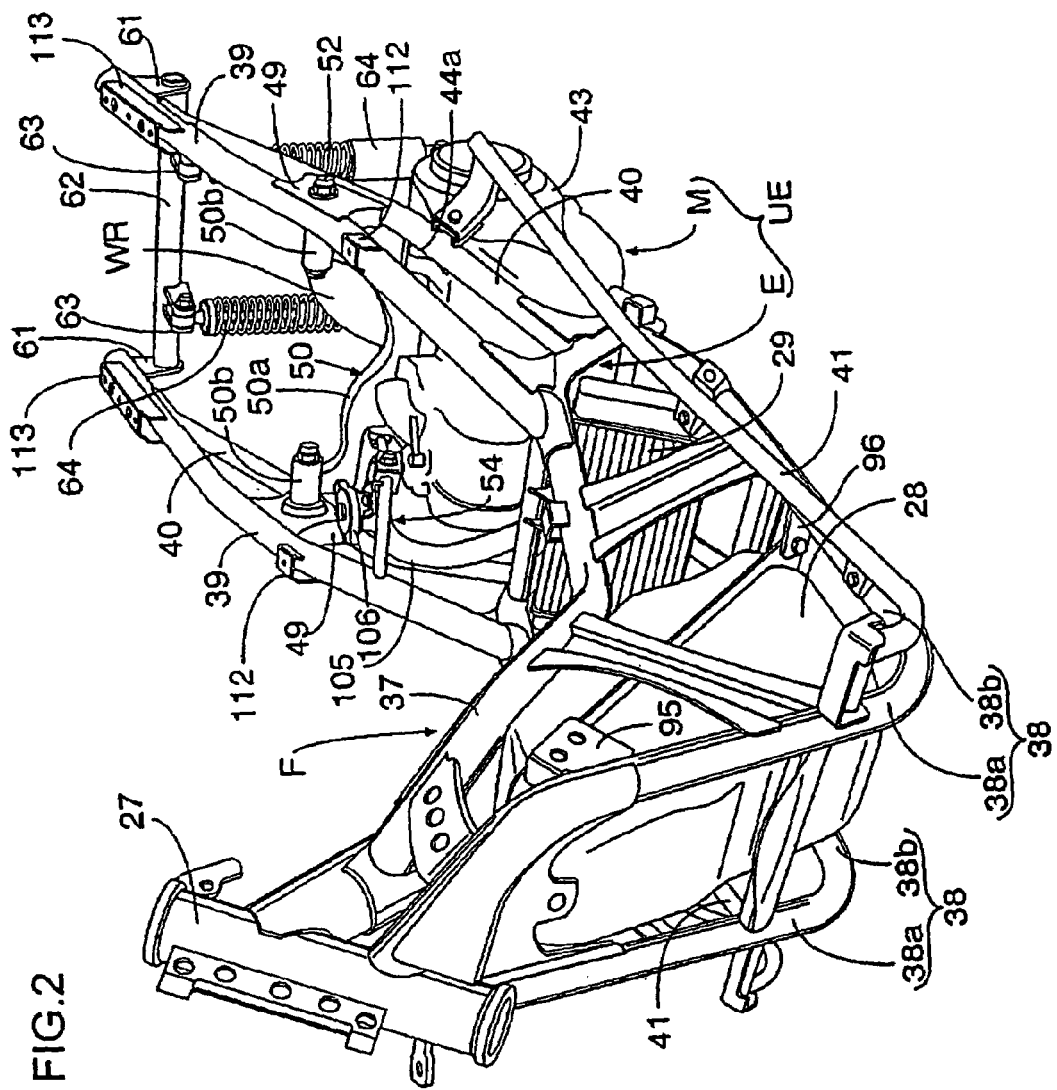
FIG. 2 is a perspective view of a vehicle body frame in a state where a fuel tank and a radiator are attached.
Figure 3:
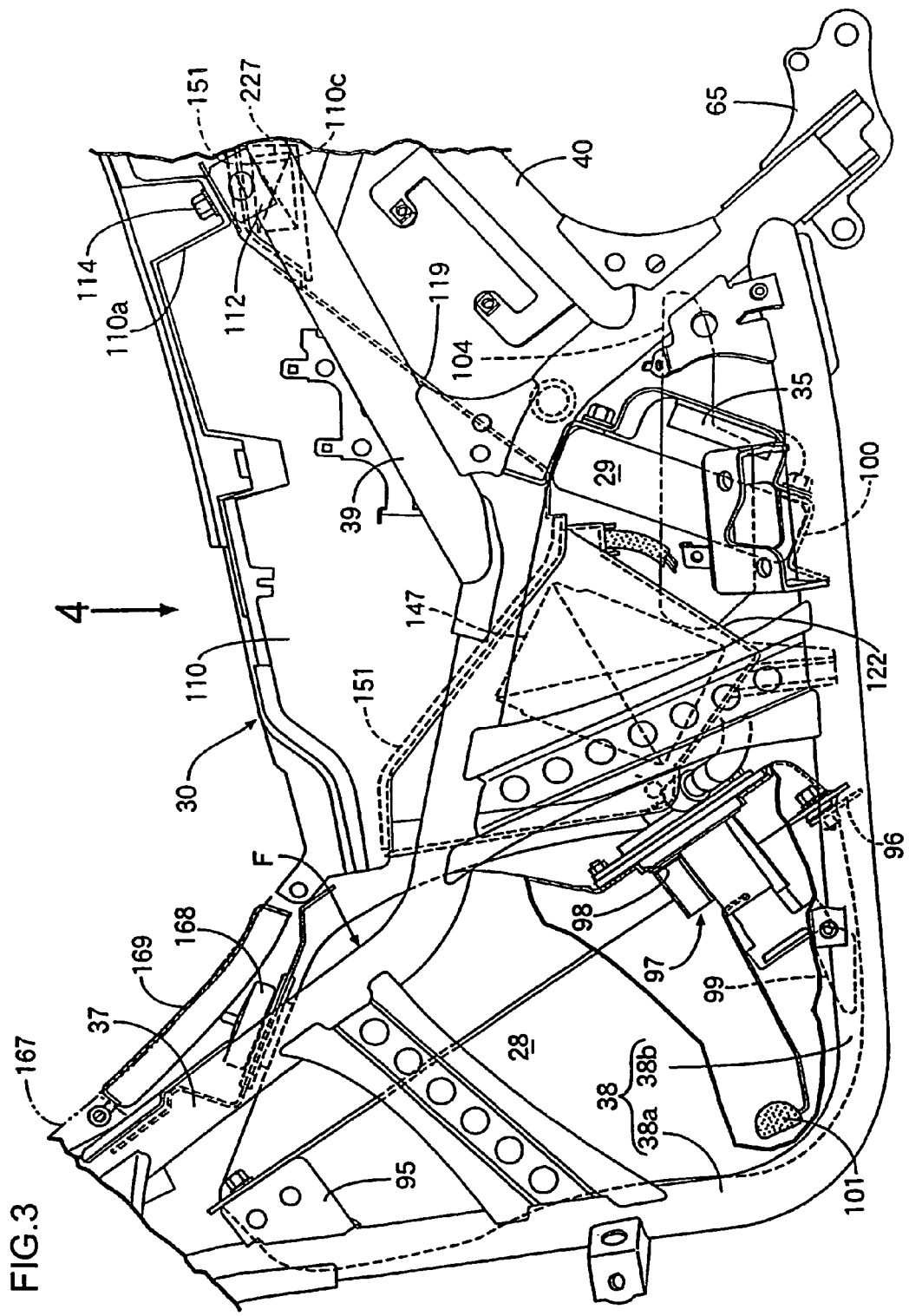
FIG. 3 is a left side view of a middle portion of the scooter-type vehicle in the fore-and-aft direction in a state where a riding seat and a vehicle body cover are removed.

With reference to FIGS. 2 and 3 together, the vehicle body frame F includes the head pipe 27, a pair of right and left upper down frames 37, 37, a pair of right and left lower down frames 38, 38, a pair of right and left seat rails 39, 39, a pair of right and left rear frames 40, 40, and a pair of right and left support frames 41, 41. The upper down frames 37, 37 are connected to the head pipe 27 and extended downward and rearward. Each of the lower down frames 38, 38 includes: an inclined part 38a connected to the head pipe 27 below the upper down frames 37, 37 and extended downward and rearward; and a horizontal part 38b integrally connected to the rear end of the inclined part 38a, and the rear ends of the lower down frames 38, 38 are welded to the rear end portions of the upper down frames 37, 37, respectively. The rear frames 40, 40 connect the rear portions of the upper down frames 37, 37 and the rear portions of the seat rails 39, 39, respectively. The support frames 41, 41 are arranged outside the upper down frames 37 and 37, the lower down frames 38, 38, and the rear frames 40 and 40 and extended in the fore-and-aft direction.

The both support frames 41, 41 support step floors 159, 159 from below, the step floors 159, 159 being provided to the right and left of the vehicle body cover 34. The front ends of the both support frames 41, 41 are respectively coupled to the lower portions of the inclined parts 38a, 38a of the lower down frames 38, 38, and the rear ends of the both support frames 41, 41 are respectively coupled to middle portions of the rear frames 40, 40.

Figure 4:
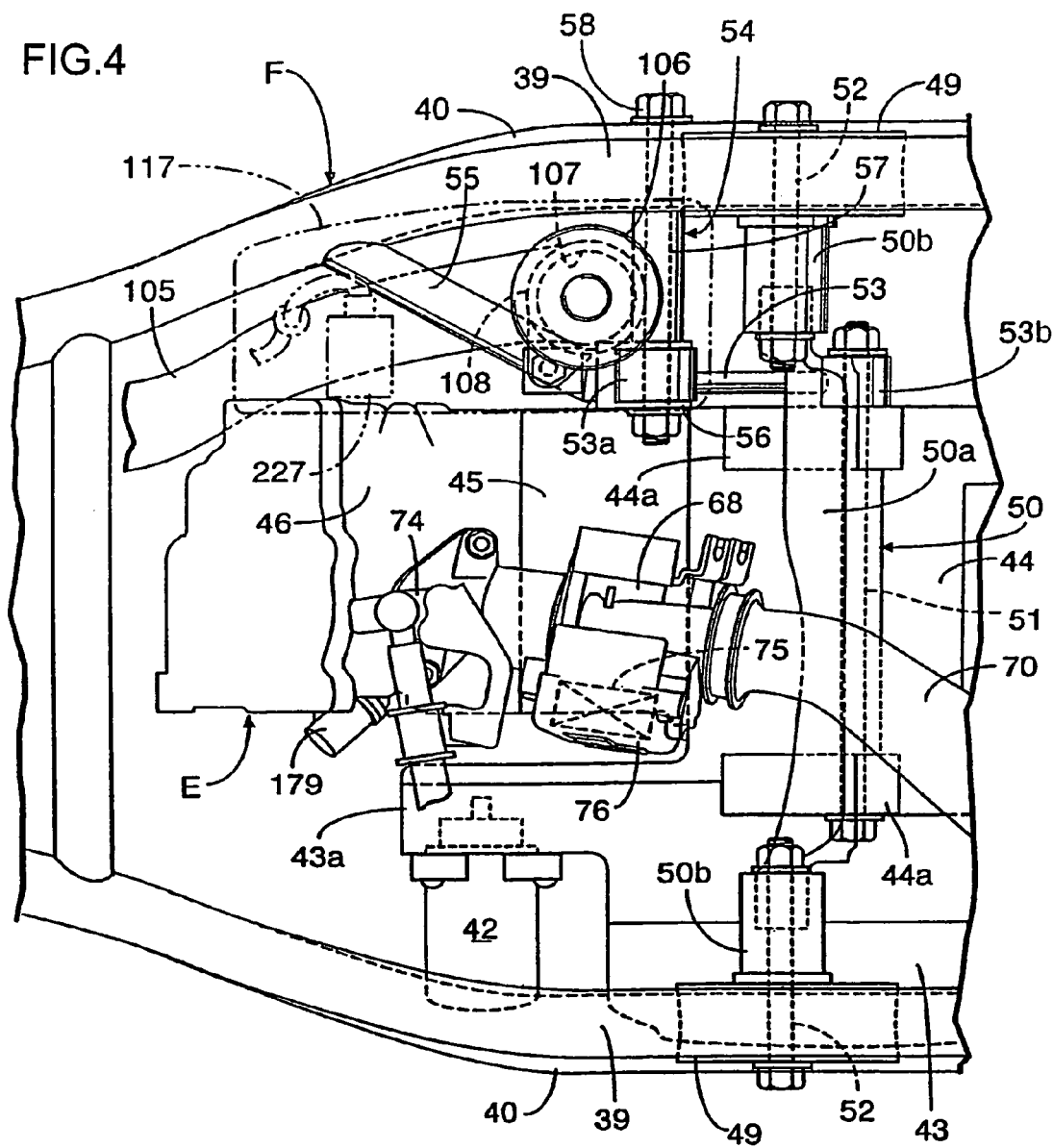
FIG. 4 is a view in a direction of arrows 4 of FIG. 3 in a state where a storage box is removed.
Figure 5:
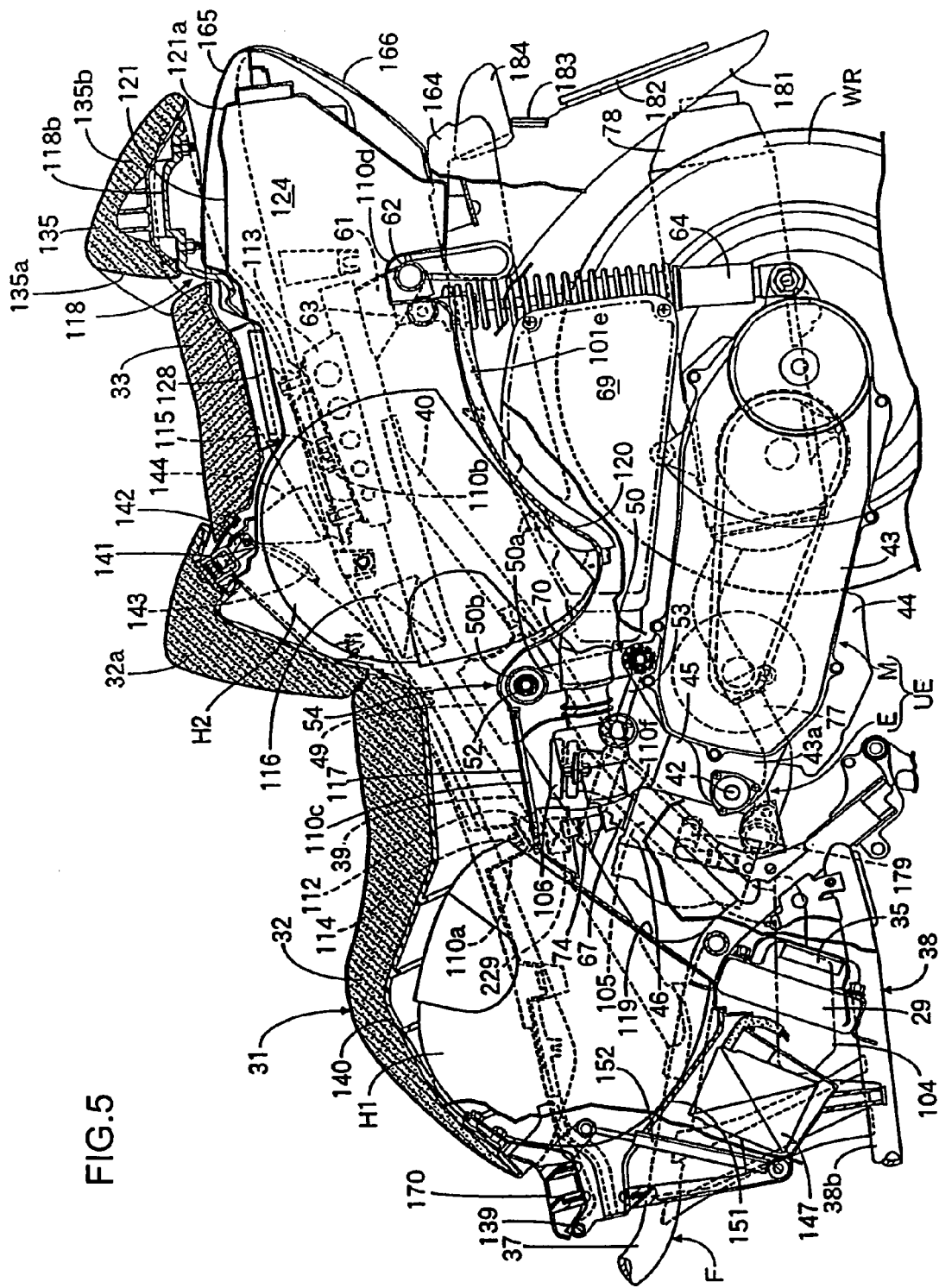
FIG. 5 is an enlarged longitudinal side view of a rear portion of the scooter-type vehicle.
Figure 6:
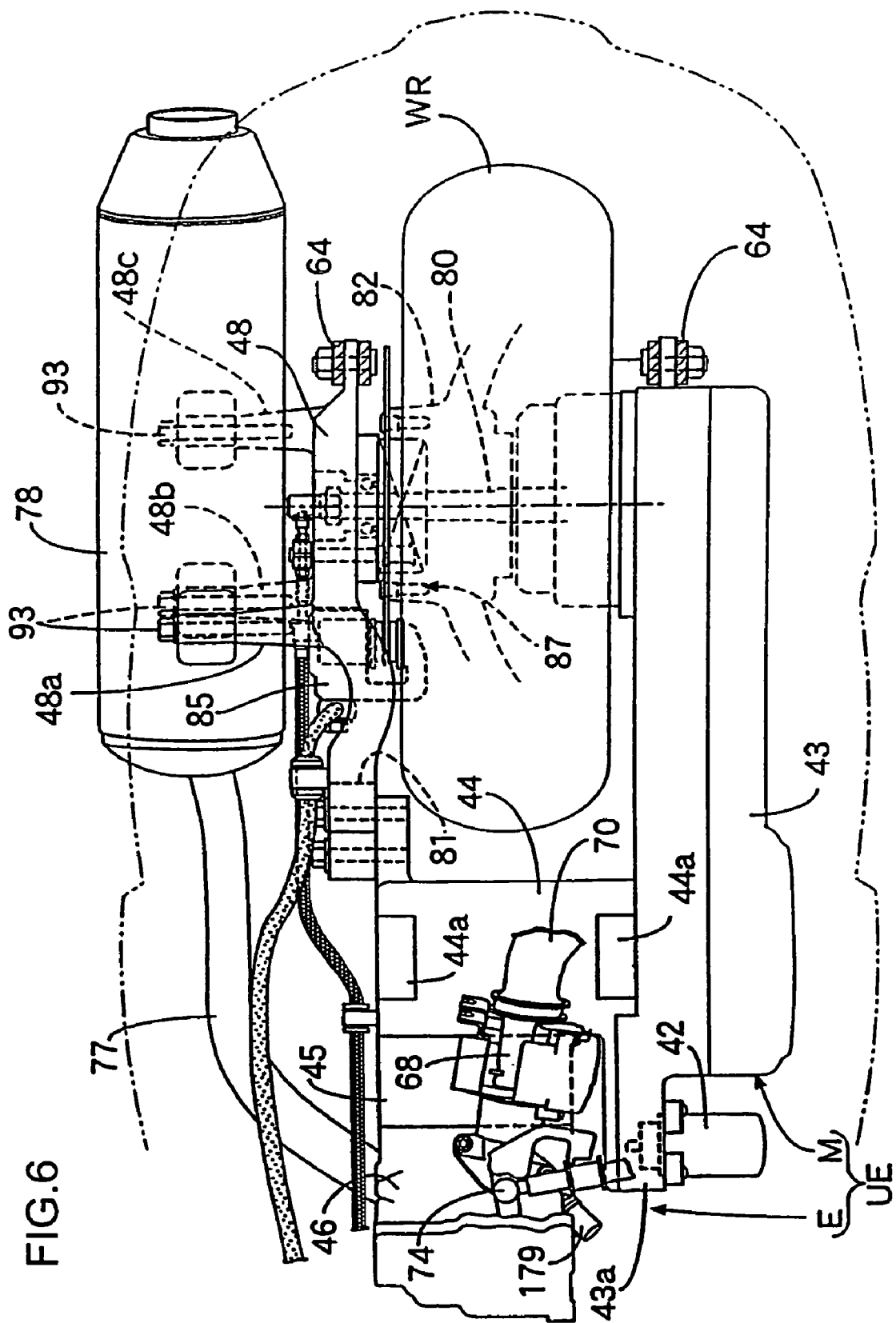
FIG. 6 is a view showing a relative arrangement of a unit swing engine and a rear wheel.

With reference to FIGS. 4 to 6 together, the unit swing engine UE includes a water cooled engine E with a substantially horizontal cylinder axis and a belt-type continuously variable transmission M continuously vary an output of the engine E by means of a transmission belt and pulleys and transmits the same to the rear wheel WR. The continuously variable transmission M drives a moving pulley on the crankshaft side according to operations of an electric motor 42 for gear change and continuously varies the gear ratio.

The transmission case 43 of the continuously variable transmission M is provided continuously to the left side of a crankcase 44 of the engine E so as to protrude from the engine E leftward and is extended to the left side of the rear wheel WR. The right side of the crankcase 44 is coupled with the front end portion of a swingarm 48. The axle of the rear wheel WR is supported between the rear end portion of the transmission case 43 and the rear end portion of the swingarm 48.

The gear change electric motor 42 is arranged to the left of a cylinder 45 of the engine E forward of the continuously variable transmission M and attached to a front protrusion 43a of the transmission case 43 with a rotation axis directed to the body width direction. The electric motor 42 is arranged under a left passenger step 162 of a pair of the right and left passenger step 162, 162 provided for the vehicle body cover 34. The electric motor 42 is also arranged so as to be positioned under the left support frame 41 of the both support frames 41, 41 when viewed from the side, the both support frames 41, 41 constitute a part of the vehicle body frame F.

Between the seat rails 39, 39 and the middle portions of the rear frames 40, 40 in the vehicle body frame F, brackets 49, 49 are provided, respectively. In the upper surface of the crankcase 44 of the engine E, a pair of supporting protrusions 44a, 44a is protruded. A link 50 includes a link cylinder portion 50a and cylindrical support cylinder portions 50b, 50b coaxially and integrally provided in both ends of the link cylinder portion 50a. The support protrusions 44a, 44a are connected to the link cylinder portion 50a with a connecting shaft 51, which is a bolt. The support cylinder portions 50b, 50b at both ends of the link 50 are rotatably supported on the brackets 49, 49 through supports shafts 52, 52 parallel to the connecting shaft 51, respectively. In other words, the unit swing engine UE is supported on the vehicle body frame F so as to swing around axes of both support shafts 52, 52.

A tension rod 53 is provided between the engine E and the vehicle body frame F. At both ends of the tension rod 53, ring-shaped connecting portions 53a, 53b are provided. The connecting portion 53a at an end of the tension rod 53 is rotatably connected to an attachment portion 54 provided in the right seat rail 39 and the rear frame 40 of the vehicle body frame F. The connection portion 53b at the other end of the tension rod 53 is rotatably connected to the right end of the connecting shaft 51 connecting the crankcase 44 to the link 50.

The attachment portion 54 includes a support cylinder 55 extending from the front portion of the right seat rail 39 downward and obliquely rearward, a bracket 56 which is substantially U-shape, open rearward and is fixed to the rear end of the support cylinder 55, and a connecting cylinder 57 connecting the right rear frame 40 and the bracket 56. The connecting portion 53a at an end of the tension rod 53 is rotatably supported on the attachment portion 54 with a bolt 58 fixed to the vehicle body frame F so as to be inserted into the bracket 56 and the connecting cylinder 57.

Support plates 61, 61 hanging downward are respectively fixed to the rear ends of the both seat rails 39, 39 of the vehicle body F. To a pair of brackets 63, 63 provided for a support pipe 62 laid between the support plates 61, 61, the upper end portions of rear cushions 64, 64 are fixed, respectively. The lower end portions of the rear cushions 64, 64 are connected to the rear end portion of the transmission case 43 and the rear end portion of the swingarm 48, respectively.

In the rear ends, or the lower ends, of the both upper down frames 37 and 37, brackets 65, 65 are attached, respectively, and a main stand 66 is rotatably supported by the both brackets 65, 65. When the main stand 66 is stood, therefore, the scooter-type vehicle is allowed to stand itself with the rear wheel WR spaced from the ground as shown in FIG. 1.

When the scooter-type vehicle is moved, the main stand 66 only needs to be retracted so that the rear wheel WR touches the ground.

The downstream end of a throttle body 68 is connected to the upper surface of the cylinder head 46 of the engine E through a curved intake pipe 67 extending rearward from the cylinder head 46. The upstream end of the throttle body 68 is connected to an air cleaner 69 arranged above the continuously variable transmission M of the unit swing engine UE through a connecting pipe 70 passing above a link cylinder portion 50a of the link 50.

A fuel injection valve 74 is attached to the intake pipe 67, and a control box 76 accommodating a controller 75 is attached to the throttle body 68. The controller 75 controls ignition timing of the engine E and the amount of fuel injected by the fuel injection valve 74.

Figure 7:
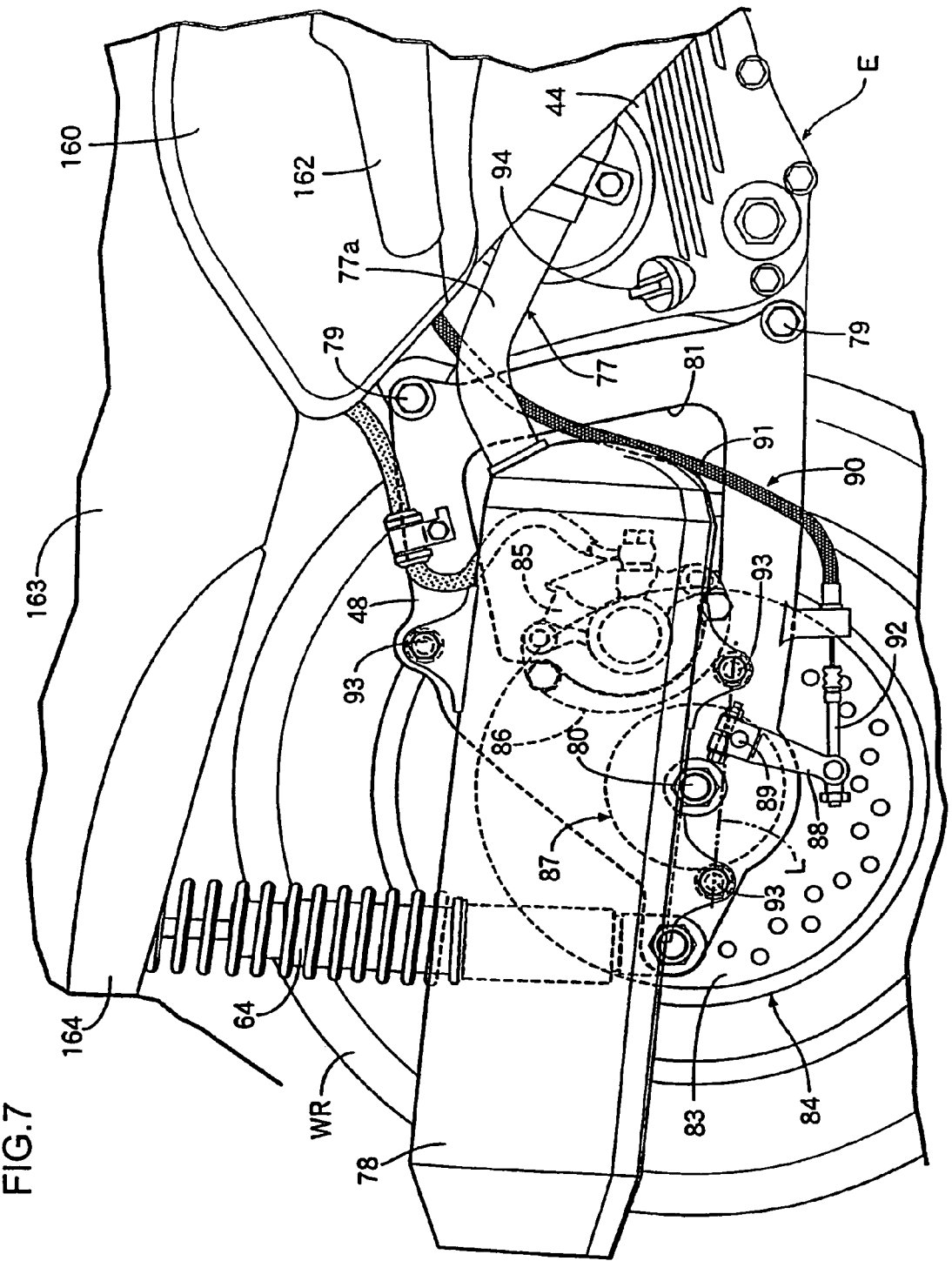
FIG. 7 is a right side view of the rear portion of the scooter-type vehicle.

An exhaust pipe 77 is connected to the lower surface of the cylinder head 46. The exhaust pipe 77 is, as shown in FIG. 7, connected to an exhaust muffler 78 arranged to the right of the swingarm 48.

The swingarm 48 is formed into a substantially triangular shape with the rear end side narrowed when viewed from the side. The front portion of the swingarm 48 is fastened to the crankcase 44 of the engine E with bolts 79 and 79 at two upper and lower places. An axle 80 of the rear wheel WR is supported by the rear portion of the swingarm 48, and the lower end of the rear cushion 64 is connected to the rear end of the swingarm 48 rearward of the axle 80.

The substantially center portion of this swingarm 48 is provided with an opening portion 81, and a brake caliper 85 of a rear brake 84, which is a disc brake, is arranged within the opening portion 81. The rear brake 84 includes a brake disk 83 attached to a hub 82 of the rear wheel WR. A caliper bracket 86 is fixed to the swingarm 48, and the brake caliper 85 is fixed to the caliper bracket 86.

The opening portion 81 is formed so as to have a vertical width narrowed toward the rear. The brake caliper 85 arranged in the rear portion of the opening portion 81 is fixed to the caliper bracket 86 fixed to the swingarm 48 rearward of the opening portion 81.

A drum brake 87 for a parking brake is attached to the hub 82 of the rear wheel WR. A lever 88 causing the drum brake 87 to perform a brake operation is arranged in the outside of the swingarm 48. A pivot shaft 89 to which the proximal end of the lever 88 is fixed is rotatably penetrated into the swingarm 48 and inserted into the drum brake 87. On the other hand, an end portion of an outer cable 91 provided for a brake cable 90 is supported by the lower portion of the swingarm 48, and an end portion of an inner cable 92 projected from an end portion of the outer cable 91 is connected to the distal end portion of the lever 88.

The swingarm 48 is integrally provided with three support bosses 48a, 48b, and 48c protruding outward. The exhaust muffler 78 fastened to the support bosses 48a to 48c with bolts 93 . . . is arranged in the outside of the swingarm 48 so as to cover the brake caliper 85, which is arranged within the opening portion 81, from the outside. Moreover, the brake caliper 85 is arranged between the support bosses 48a and 48b among the support bosses 48a to 48c, and the brake caliper 85 can be protected by those support bosses 48a and 48b.

The lower portion of the exhaust muffler 78 is supported at two of the support bosses 48a to 48c below the exhaust muffler 78 on the front and rear sides of the axle 80 of the rear wheel WR. In other words, the lower portion of the exhaust muffler 78 is fastened to the swingarm 48 at two places in both front and rear sides of the axle 80. The portions at which the axle 80 and the rear cushion 64 are fastened to the swingarm 48 are arranged between the exhaust muffler 78 and a straight line L connecting the fastening portions of the exhaust muffler 78.

In the vicinity of a connected portion of the exhaust pipe 77 to the exhaust muffler 78, a level gauge 94 is arranged. The level gauge 94 is placed in the lower part of the crankcase 44 so as to detect an oil level within the crankcase 44 provided for the engine E. In the vicinity of the portion connected to the exhaust muffler 78 in the exhaust pipe 77, a curved portion 77a curved to be convex upward is formed to avoid interference with the level gauge 94.

Fuel is supplied from the fuel tank 28 to the fuel injection valve 74 injecting fuel to the engine E. This fuel tank 28 is arranged in a space which is surrounded by the pair of right and left upper down frames 37, 37 and the pair of right and left lower down frames 38, 38 of the vehicle body frame F and is directly in rearward of the front wheel WF. Moreover, the fuel tank 28 is formed so as to extend vertically from the rear of the lower portion of the head pipe 27 to the lower portions of the both lower down frames 38, 38.

Attachment plates 95, 95 for fastening the upper portion of the fuel tank 28 are respectively welded to the inclined parts 38a, 38a of the both lower down frames 38, 38. Attachment plates 96, 96 for fastening the lower portion of the fuel tank 28 are respectively welded to the horizontal parts 38b and 38b of the both lower down frames 38, 38.

A lower portion of the fuel tank 28 accommodates a pump unit 97. The pump unit 97 is attached to the fuel tank 28 in the back of the fuel tank 28 so as to be inserted into the fuel tank 28 from an attachment hole 98 provided in the lower back of the fuel tank 28.

Moreover, the pump unit 97 is attached to the fuel tank 28 in a posture with a rotation axis thereof sloped down toward the front, and a fuel filter 99 annexed to the pump unit 97 so as to suck fuel within the fuel tank 28 is arranged in the lowermost portion within the fuel tank 28. A float 101 moving up and down according to the amount of fuel within the fuel tank 28 is extended from the pump unit 97. The amount of remaining fuel detected by this float 101 is transmitted to the controller 75 within the control box 76 attached to the throttle body 68.

The radiator 29 including a radiator fan 35 is arranged at a position spaced rearward from the fuel tank 28. This radiator 29 is supported by a support frame 100 provided between the rear portions of the horizontal parts 38b, 38b in the both lower down frames 38 and 38 of the vehicle body frame F and the rear portions of the both upper down frames 37, 37 of the vehicle body frame F.

A reservoir tank 104 connected to the radiator 29 is arranged under the right step floor 159 of the pair of right and left step floors 159 and 159 provided for the vehicle body cover 34. A hose 105 linked to this reservoir tank 104 is extended upward, and the upper end of the hose 105 is connected to a water intake forming member 108 forming a water intake 107 which can be opened and closed with a cap 106.

The water intake forming member 108 is supported by the attachment portion 54 with which the tension rod 53 is attached to the vehicle body frame F. Herein, the tension rod 53 is provided between the vehicle body frame F and the unit swing engine UE swingably supported by the vehicle body frame F. Specifically, the water intake forming member 108 is supported by the support cylinder 55 extended from the front portion of the right seat rail 39 downward and diagonally rearward and constituting a part of the attachment portion 54.

Figure 8:
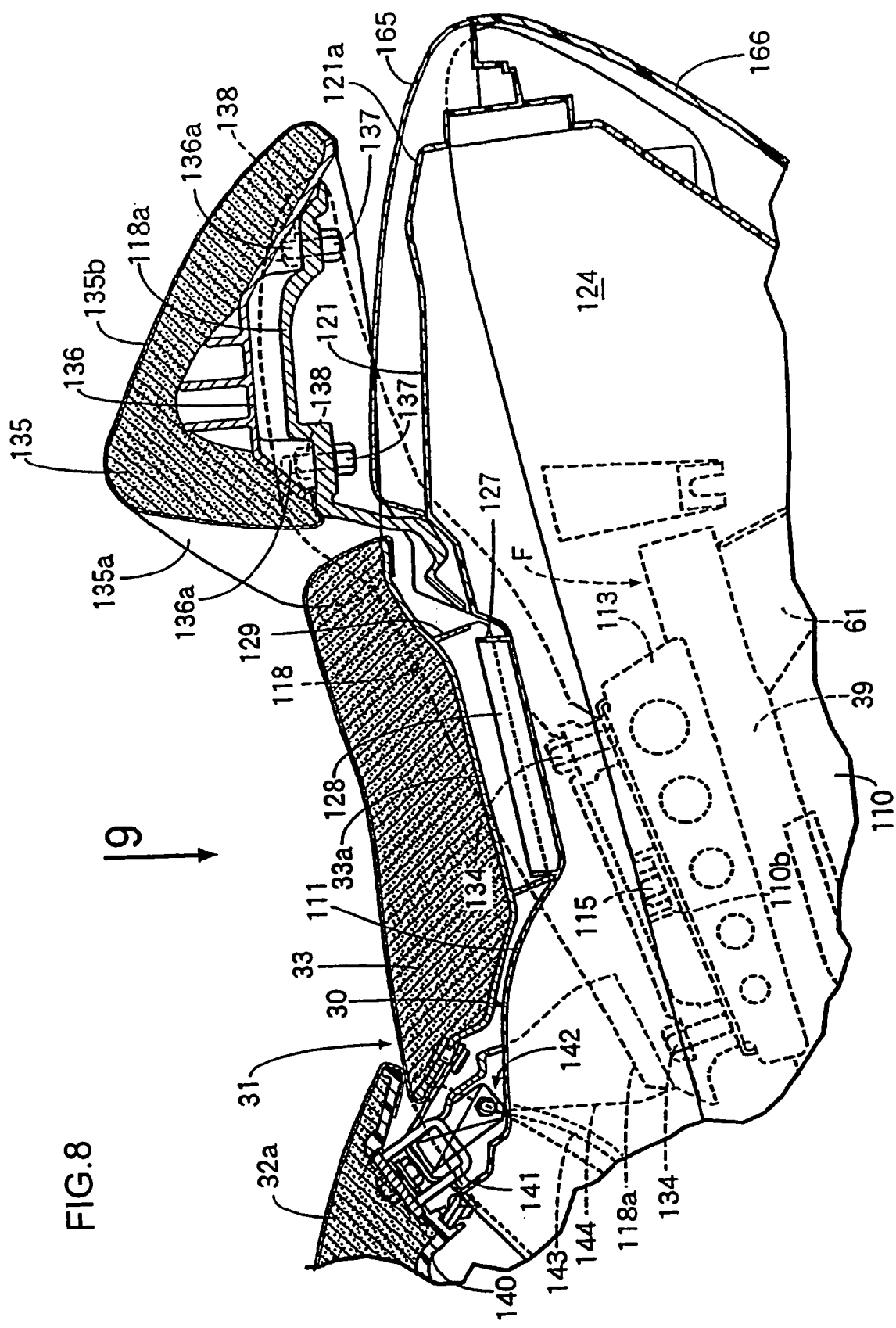
FIG. 8 is a longitudinal-sectional view around the rear portion of the storage box.

With reference to FIGS. 8 and 9 together, the storage box 30 is arranged among the rear portions of the both upper down frames 37, 37 of the vehicle body frame F, the both seat rails 39, 39, and the both rear frames 40, 40. This storage box 30 is composed of a box body 110 with the upper end opened and an top surface cover 111 coupled to the box body 110 so as to cover the rear part of the box body 110 from above. The storage box 30 is arranged under the riding seat 31 so as to extend from under the front end of the riding seat 31 to near the upper portions of the rear cushions 64, 64.

In order to support the storage box 30 on the vehicle body frame F, front support members 112, 112 are respectively welded to middle portions of the paired seat rails 39, 39 of the vehicle body frame F, and rear support members 113, 113 relatively long in the fore-and-aft direction are respectively welded to the rear portions of the both seat rails 39, 39. On the other hand, the upper portion of the box body 110 of the storage box 30 are provided with front attachment portions 110a, 110a and rear attachment portions 110b, 110b on the both sides. The front attachment portions 110a, 110a are mounted on the front support members 112, 112, respectively, and the rear attachment portions 110b, 110b are mounted on the longitudinal middle portions of the rear support members 113, 113, respectively. The front attachment portions 110a, 110a are fastened to the front support members 112, 112 with bolts 114, 114, respectively, and the rear attachment portions 110b and 110b are fastened to the rear support members 113, 113 with bolts 115, 115, respectively.

In the bottom wall of the storage box 30, or the bottom wall of the box body 110, a front helmet storage section 119, a rear helmet storage section 120, and a shallow bottom portion 110c substantially flat are formed. The front helmet storage section 119 is arranged under the front seat 32 so as to accommodate a helmet H1. The rear helmet storage section 120 is arranged under the rear seat 33 so as to accommodate a helmet H2. The shallow bottom portion 110c is arranged between the front and rear helmet storage sections 119 and 120. The front and rear helmet storage sections 119 and 120 are formed into shapes bulged downward. Moreover, the front edge of the top surface cover 111 of the storage box 30 is formed into an arc which is convex rearward when viewed from the top such that the rear helmet storage section 120 can accommodate the helmet H2. In the portion corresponding to the front portion of the top surface cover 111, a lighting unit 116 for illuminating the inside of the storage box 30 is attached to the inner side surface of the box body 110.

Under the shallow bottom portion 110c of the storage box 30, the throttle body 68 and the fuel injection valve 74 are arranged with the upper ends thereof set at a substantially same height, and the water intake 107 of the reservoir tank 104 is arranged. A first maintenance lid 117 is attached to the shallow bottom portion 110c above the water intake 107 so as to be opened and closed.

In the rear portion of the storage box 30, a support pipe 62 and a rear bulge portion 121 bulged rearward beyond the rear end of the rear seat 33 are provided. The support pipe 62 is an attachment portion with which the rear cushions 64, 64 are attached to the rear part of the vehicle frame F. This rear bulge portion 121 is bulged rearward up to a position substantially the same as the rear end of a grab rail 118 arranged around the rear seat 33. In addition, a narrow portion 121a interposed between right and left tail light units 123, 123 when viewed from the top is provided in the center of the rear portion of the rear bulge portion 121.

The lower portion of the rear bulge portion 121 is arranged under the support pipe 62, which is a portion with which the upper portions of the rear cushions 64, 64 are attached to the rear portion of the vehicle frame F. Accordingly, a raised portion 110d corresponding to the portion with which the upper portions of the rear cushions 64 are attached to the vehicle body frame F is formed so that the bottom wall of the storage box 30, or the box body 110, is partially raised. A storage section 124 with the raised portion 110d interposed between the storage section 124 and the rear helmet storage section 120 is formed within the rear bulge portion 121.

The rear seat 33 of the riding seat 31 is formed so as to cover the front side of the top surface cover 111 of the storage box 30. The front edge of the rear seat 33 is formed into an arc which is convex rearward when viewed from the top so as to correspond to the front edge of the top surface cover 111.

In FIG. 10, the rear seat 33 is detachably attached to the top surface cover 111 of the storage box 30. On both sides of the front portion of the top surface cover 111, backup plates 111a, 111a projecting laterally are integrally provided. Elastic rings 125, 125 made of elastic material are attached to these backup plates 111a and 111a, respectively. On the other hand, in the bottom plate 33a of the rear seat 33, fitting protrusions 126, 126 having annular concave portions 126a and 126a allowing the elastic rings 125, 125 to be elastically engaged therewith in the outer peripheries thereof are integrally provided to be protruded. The annular concave portions 126a, 126a are elastically engaged with the elastic rings 125, 125 with the fitting protrusions 126 and 126 fitted therein, and the rear seat 33 is thereby detachably attached to the top surface cover 111.

In the upper surface of the top surface cover 111, a first rib 127 with a shape having quadrangles endlessly connected is protruded, and a storage space 128 available according to attachment and detachment of the rear seat 33 is formed in the upper surface 33 of the top surface cover 111 so as to be surrounded by the first rib 127. Moreover, a second rib 129 which surrounds the first rib 127 and endlessly continuous is hung down from the bottom plate 33a of the rear seat 33, and the first and second ribs 127 and 129 constitute a labyrinth structure surrounding the storage space 128.

The grab rail 118 is made of metal and integrally includes grip portions 118a, 118a which are arranged on both sides of the rear seat 33 and extended in the fore-and-aft direction and a connecting portion 118b connecting the rear ends of the grip portions 118a, 118a. The front portion of each of the grip portions 118a, 118a is fastened to the corresponding rear support member 113 with bolts 134, 134 on the front and rear sides at two places which sandwich portions of the storage box 30 fastened to each rear support member 113. Herein, the rear support members 113, 113 are welded to the rear portions of the seat rails 39, 39 of the vehicle body frame F, respectively.

The connecting portion 118b is arranged at a position spaced upward from the upper portion of the rear bulge portion 121 of the storage box 30 and is integrally provided continuously to the rear ends of the both grip portions 118a, 118a so as to be at a substantially same height as the upper surface of the rear seat 33. A backrest 135 holding the lower back of a passenger sitting on the rear seat 33 from the rear is detachably attached to this connecting portion 118b.

Specifically, in a bottom plate 136 of the backrest 135, a plurality of leg portions 136a abutting on the connecting portion 118b of the grab rail 118 are provided integrally therewith so as to be protruded. In each of the leg portions 136a, a nut 138 is embedded. The bolts 137, which are inserted into the connecting portion 118b from below, are screwed and fastened to the respective nuts 138, and the backrest 135 is thereby detachably attached to the upper surface of the rear part of the grab rail 118, or to the upper surface of the connecting portion 118b.

In addition, the backrest 135 includes a front inclined surface 135a and a rear inclined surface 135b in the upper surface and is formed into a substantially streamlined shape. When viewed from the side, the front inclined surface 135a is sloped down toward the front, and the rear inclined surface 135b is sloped down toward the rear. When viewed from the top, the backrest 135 is shaped such that the width is gradually narrowed toward the rear. The grab rail 118 and the backrest 135 are almost wholly overlapped to each other when viewed from the top.

The front seat 32 of the riding seat 31 is provided integrally with a backrest portion 32a in the rear portion. The backrest portion 32a is raised upward so as to hold the lower back of a driver sitting on the front seat 32 from the rear. The front seat 32 is arranged above the storage box 30 so as to cover a front opening portion from above, which is not covered with the top surface cover 111 in the storage box 30. The front end portion of the front seat 32 is connected to the front end of the storage box 30 through a hinge pin 139. In other words, the front end portion of the front seat 32 is supported by the storage box 30 so as to be opened and closed up and down.

A substantially U-shaped striker 141 is attached to the rear portion of a bottom plate 140 of the front seat 32. Between the front portion of the top surface cover 111 of the storage box 30 and the front portion of the rear seat 33, a seat catcher 142 capable of switching a seat catch state and a seat catch released state is arranged at a position corresponding to the center of the rear seat 33 in the width direction. Herein, the seat catcher 142 in the seat catch state grips the striker 141 and holds the seat 32 closed, and the seat catcher 142 in the seat catch released state releases the grip of the striker 141 and allows opening and closing operations of the front seat 32. The seat catcher 142 is constructed as follows. When the front seat 32 opened above is brought down to close the front opening portion of the storage box 30, the seat catcher 142 is engaged with the striker 141 into the seat catch state. The seat catcher 142 is switched from the seat catch state to the seat catch released state by a pulling operation of a driving cable 143.

The seat catcher 142 is provided on a metallic bridge plate 144 provided between the front ends of the both grip portions 118a and 118a of the grab rail 118. This bridge plate 144 is formed so as to extend from the front ends of the both grip portions 118a, 118a, enter between the top surface cover 111 and the rear seat 33, and follow the upper surface of the front portion of the top surface cover 111.

A cover 146 is attached to the front portion of the center of the rear seat 33 in the width direction so as to cover the seat catcher 142 from above in a state where the front seat 32 is opened. The cover 146 includes a notch 145 (see FIG. 12) into which the striker 141 can be removably inserted.

Figure 11:
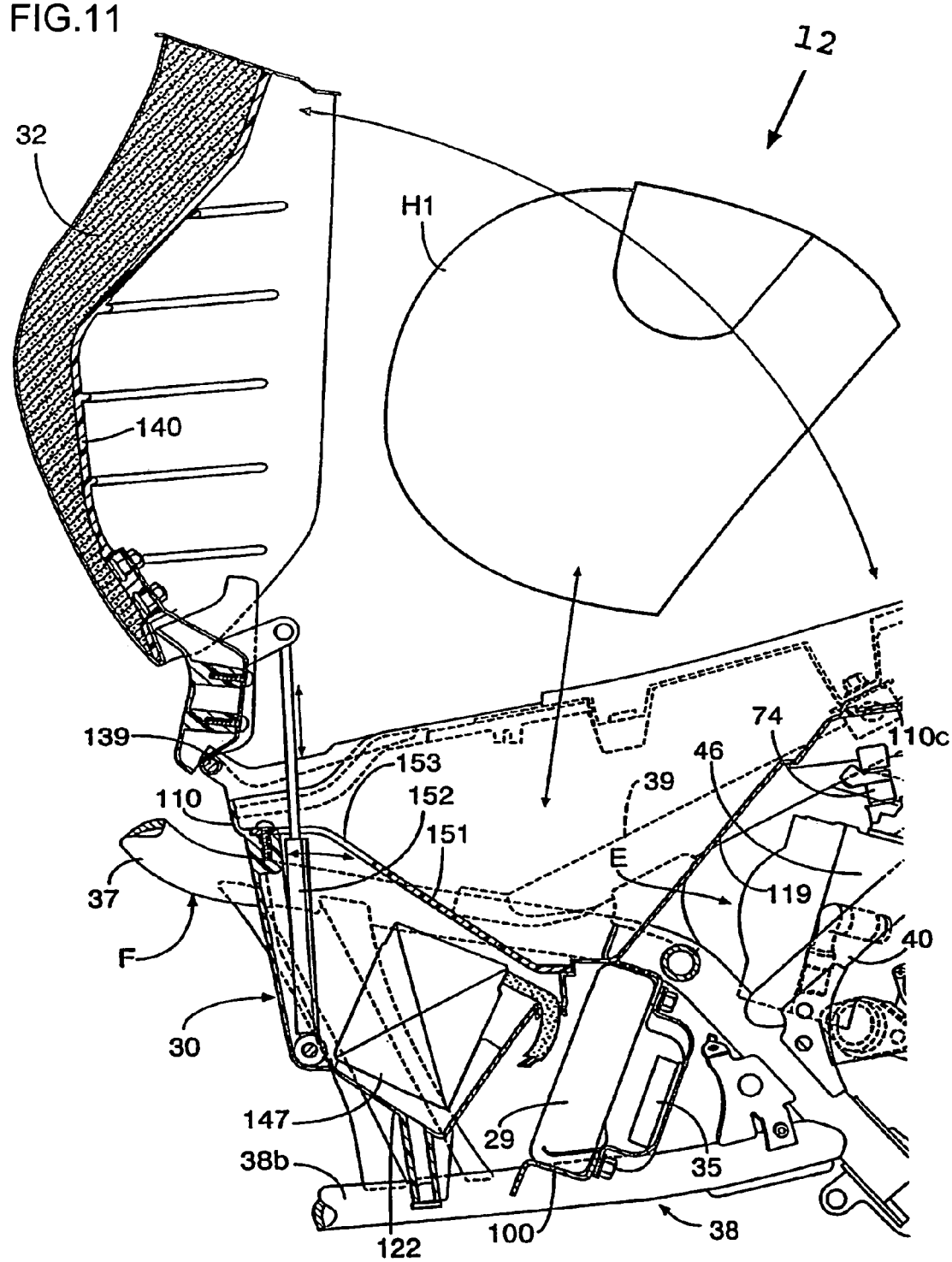
FIG. 11 is an enlarged view of a main portion of FIG. 5 in a state where a front seat is opened.
Figure 12:
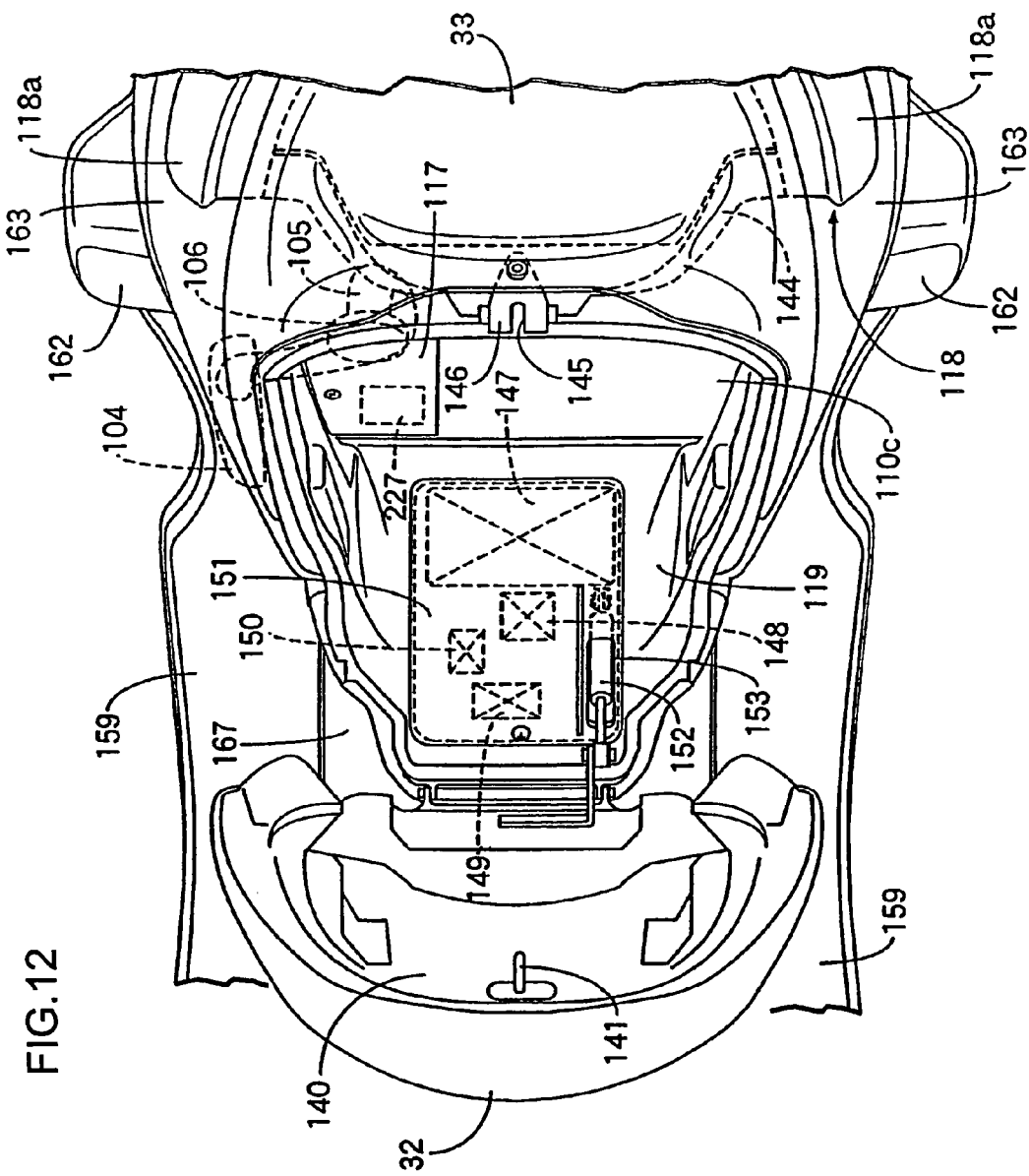
FIG. 12 is a view in a direction of arrows 12 of FIG. 11.
Figure 13:
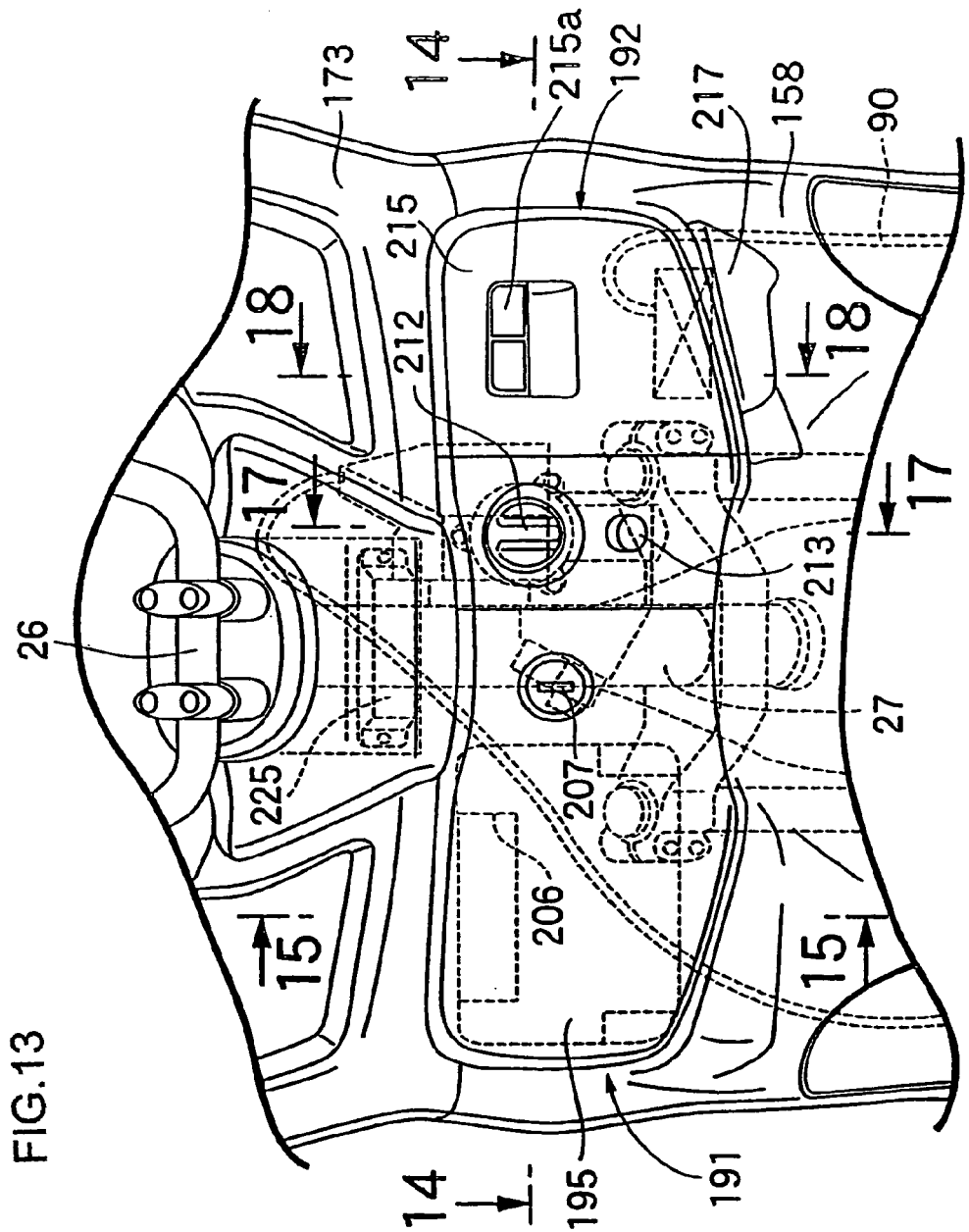
FIG. 13 is an enlarged view in a direction of arrows 13 of FIG. 1.
Figure 14:
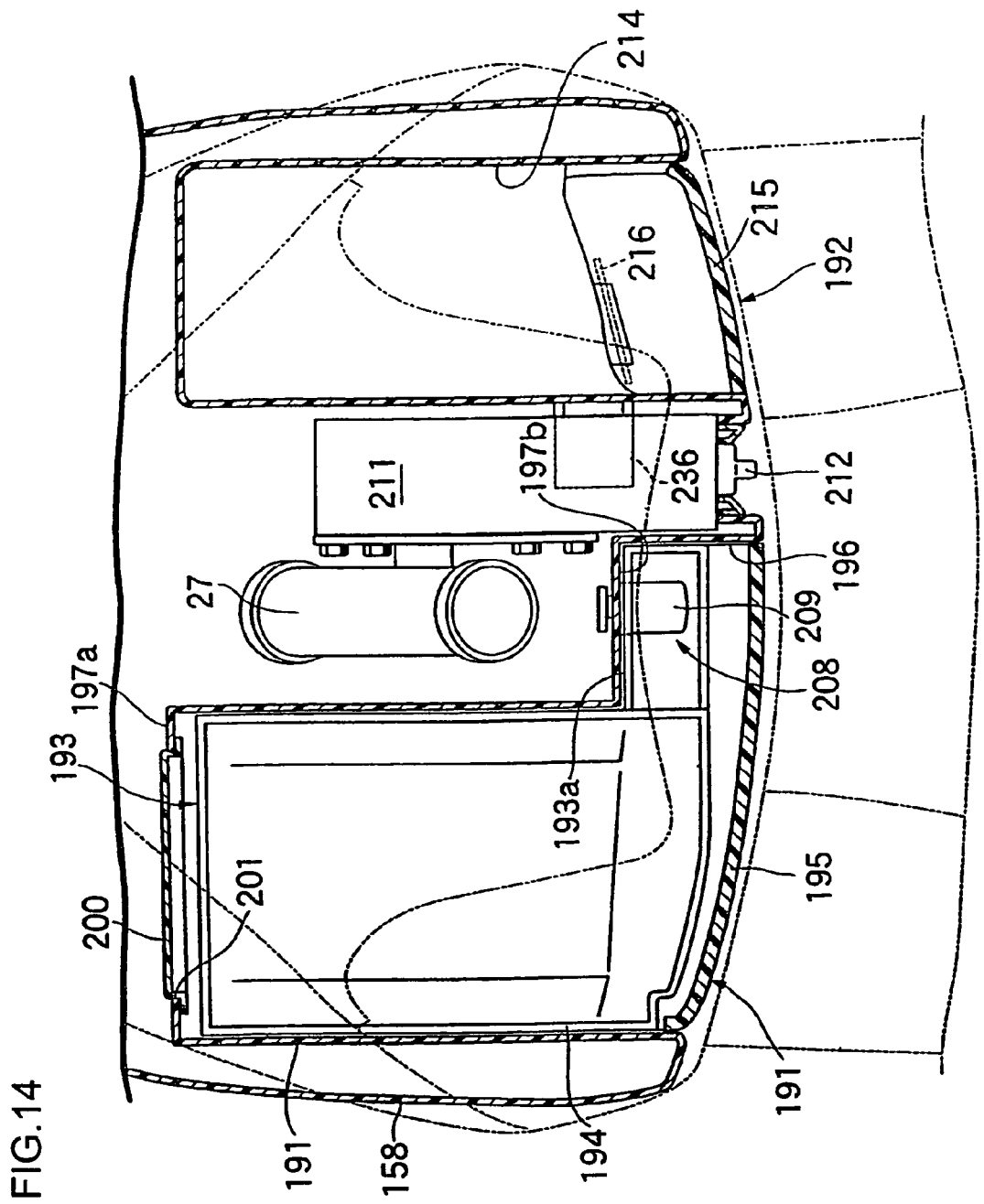
FIG. 14 is a schematic cross-sectional view taken along a line 14-14 of FIG. 13.
Figure 15:
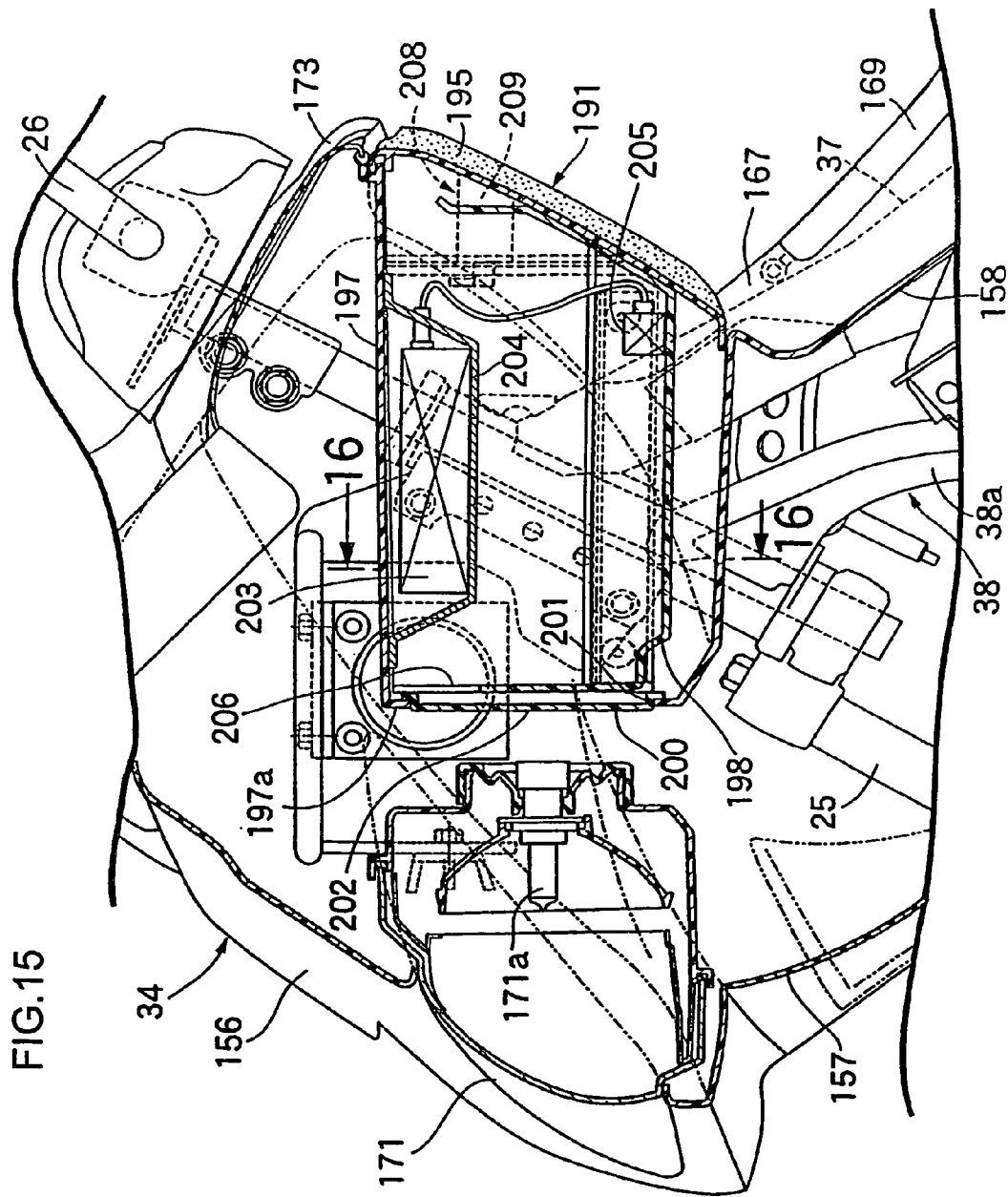
FIG. 15 is a cross-sectional view taken along a line 15-15 of FIG. 13.
Figure 16:
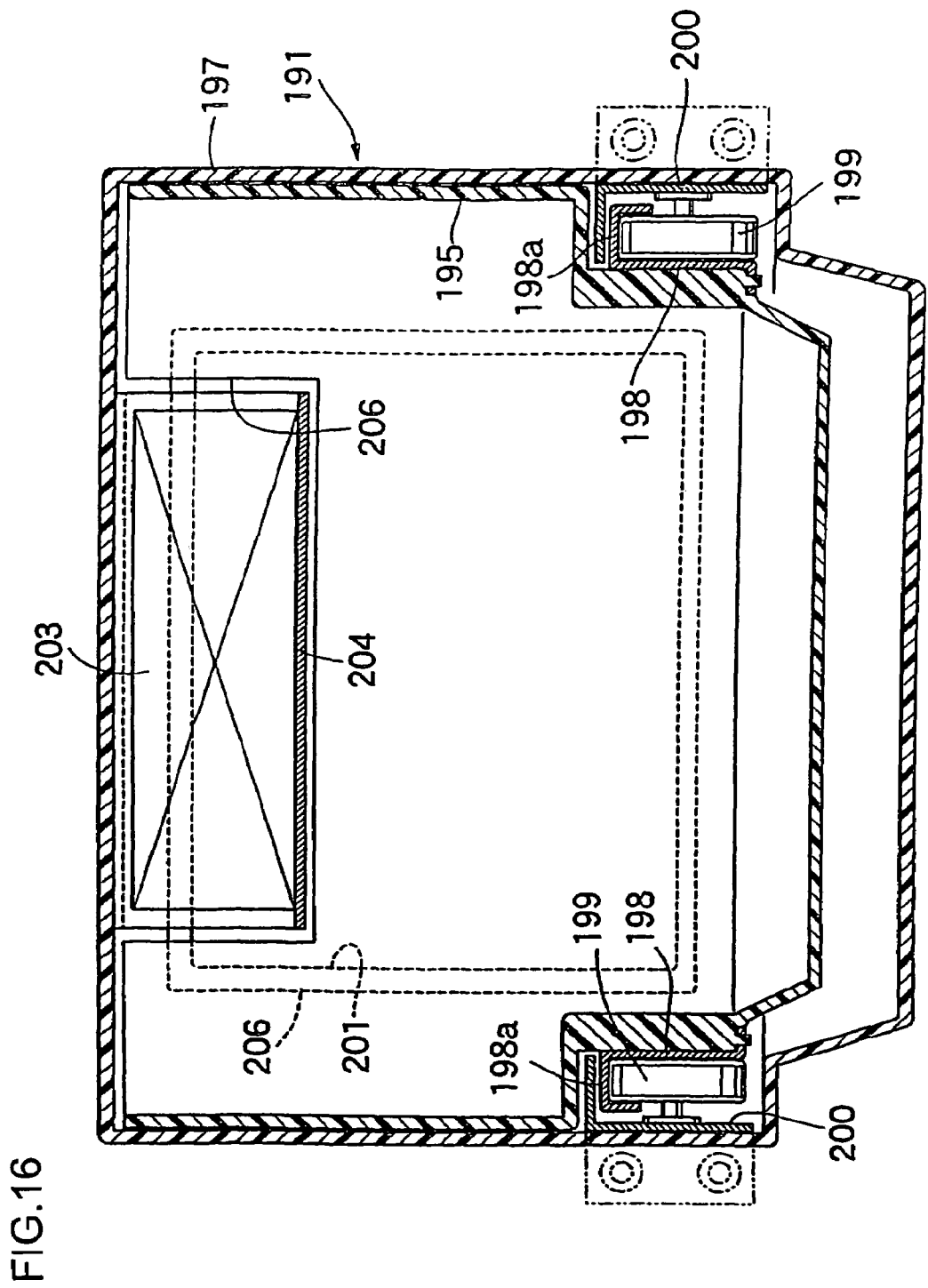
FIG. 16 is a cross-sectional view taken along a line 16-16 of FIG. 15.

With reference to FIGS. 11 and 12 together, the fuel tank 28 is arranged forward of the storage box 30. In the lower portion of the front end of the storage box 30, a front bulge portion 122 bulged forward to the vicinity of the bottom portion of the fuel tank 28 is arranged between the fuel tank 28 and the radiator 29, and a battery 147, which is an electric component, is accommodated in the front bulge portion 122. In other words, the battery 147 is arranged between the fuel tank 28 and the radiator 29.

The front bulge portion 122 accommodates, in addition to the battery 147, electric components 148, 149, 150 and the like.

In the bottom wall of the box body 110 of the storage box 30, a second maintenance lid 151, which separates the front bulge portion 122 from the front helmet storage section 119, is provided so as to be freely opened and closed. It is then possible to perform maintenance of the battery 147 and the electric components 148 to 150 within the front bulge portion 122 by opening the second maintenance lid 151 in a state where the front seat 32 is opened.

A dumper rod 152 is provided between the front portion of the front seat 32 and the front portion of the storage box 30. The dumper rod 152 assists the front seat 32 in opening and closing such that the front seat 32 can be opened with a small force and the closing speed is reduced when the front seat 32 is closed. The lower portion of the dumper rod 152 is accommodated in the front bulge portion 122. A slit 153 is provided in the second maintenance lid 151, and the dumper rod 152 can be inserted into the slit 153 so as to be allowed to be displaced along with opening and closing of the front seat 32.

Again in FIG. 1, the vehicle body cover 34 includes a front cover 156 covering the front portion of the head pipe 27 and the upper portion of the front wheel WF; a pair of right and left front side covers 157, 157 respectively joined to both right and left sides of the front cover 156; a legshield 158 joined to the both front side covers 157, 157 so as to cover the front parts of the legs of a rider sitting on the front seat 32 and to cover the head pipe 27 from the rear side; a pair of right and left floor center cover 160, 160 which is extended rearward continuously to the legshield 158 and whose lower end portions form the respective step floors 159, 159; a pair of right and left floor side covers 161, 161 hung down from the outer edges of the step floors 159, 159, respectively; the pair of right and left passenger steps 162, 162 provided in the rear portions of the step floors 159, 159, respectively; a pair of right and left body side covers 163 arranged under both sides of the riding seat 31, provided continuously to the respective floor side covers 161 and 161, and extended rearward; a rear lower cover 164 provided continuously to the lower rear portions of the body side covers 163, 163; a rear upper cover 165 arranged between the rear bulge portion 121 of the storage box 30 and the rear portion of the grab rail 118; a rear center cover 166 which is arranged between the right and left tail light units 123, 123 and is continuous to the rear upper cover 165 so as to cover the narrow portion 121a of the rear bulge portion 121 from the rear.

Part of the legshield 158 and the pair of right and left floor center covers 160, 160 form a floor tunnel portion 167 raised upward between the step floors 159, 159. The floor tunnel portion 167 is arranged from the rear of the head pipe 27 to below the front end of the riding seat 31 and positioned above the fuel tank 28 and the radiator 29. A fuel filler lid 169 is attached to this floor tunnel portion 167 so as to be freely opened and closed in order to make it possible that a fuel filer cap 168 provided in the upper end of the fuel tank 28 is opened and fuel is fed to the fuel tank 28. A hinge cover 170 covering the portion of the front seat 32 hinged to the storage box 30 is joined to the rear end of the floor runnel portion 167.

Headlights 171 and 171 are arranged between both sides of the front portion of the front cover 156 and the front portions of the paired right and left front side covers 157, 157, respectively. Blinkers 172, 172 are arranged under the headlights 171, 171 in the front portions of the both front side covers 157, 157, respectively. A panel 173, in which meters are arranged, is joined to the upper potions of the front cover 156, the both front side covers 157, 157, and the legshield 158. A meter visor 173a is integrally provided in the front portion of the panel 173 so as to be raised upward. In addition, a wind shield 174 is arranged forward of the meter visor 173a.

A front fender 175 covering the front wheel WF form above is supported by the front fork 25. A pair of right and left rearview mirrors 176, 176, a switch case 177 for audio operations, a switch case 178 for operating lumps and the like, and the like are attached to the steering handle 26.

In the left floor center cover 160 of the pair of right and left floor center covers 160, 160, a plug maintenance lid 180 for maintenance of an ignition plug 179 provided for the engine E is attached to a place forward of the left passenger step 162 so as to be opened and closed.

A license plate 182, a reflector 183, and a license light 184 are attached to a rear fender 181 covering the rear wheel WR from the rear. This rear fender 181 is attached to the rear bulge portion 121 of the storage box 30 together with the pair of right and left tail light units 123, 123 and with the rear upper cover 165 and the rear center cover 166, which are cover members constituting a part of the vehicle body cover 34.

In a portion forward of the rear fender 181 in the lower surface of the box body 110 of the storage box 30, as shown in FIG. 5, a pair of protruded rims 110e, 110e serving as a rear fender are protruded so as to be arranged on both right and left sides of the rear wheel WR.

In FIGS. 13 to 16, first and second article storage sections 191 and 192 are separately placed right and left in the legshield 158. The first article storage section 191 includes a storage case 193 capable of being pulled and detached from the legshield 158 and is configured as a pullout type.

The storage case 193 is composed of a case body 194 with a decorative cover 195 fixed to the outer end. The case body 194 is formed of synthetic resin into a rectangular box shape with the upper portion opened. In the legshield 158, a rectangular opening portion 196 through which the storage case 193 is inserted and removed is formed, and a storage wall 197 is integrally formed. The storage wall 197 is formed in a rectangular tube so as to be continuous to the opening portion 196. The inner end of the storage wall 197 is closed with the end wall 197a.

In both lower side portions of the case body 194, movable rails 198, 198 extended in the fore-and-aft direction are fixed, respectively. Support portions 198a and 198a with a substantially U-shape opened downward are integrally formed in the upper ends of the movable rails 198, 198. On the other hand, in both inner side surfaces of the storage wall 197, fixed rails 200, 200 extended in the fore-and-aft direction are respectively fixed so as to correspond to the respective movable rails 198, 198. The shafts of rollers 199, 199 are supported at a plurality of places, for example, at two places, longitudinally spaced apart in each of the fixed rails 200, 200. The storage case 193 can be thereby slid between a retracted position and a pulled-out position. When the storage case 193 is at the retracted position, the decorative cover 195 of the storage case 193 is continuous to the back surface of the legshield 158 so as to be substantially flush therewith. When the storage case 193 is at the pulled-out position, most of the storage case 193 is pulled out from the storage wall 197. The storage case 193 is inserted into the storage wall 197 from the opening portion 196, and the entire storage case 193 can be pulled out from the legshield 158. Moreover, the storage case 193 is formed so as to cover the head pipe 27 from the left when positioned at the retracted position.

The end wall 197a of the storage wall 197 is provided with a maintenance window 201, which allows maintenance works such as changing a bulb 171a of each headlight 171 positioned forward of the end wall 197a when the storage case 193 is pulled out from the legshield 158. This window 201 is covered with a detachable lid 202.

A support frame 204, on which an audio amplifier 203 is mounted, is attached to the upper surface of the storage wall 197. A connector 205 wired to the amplifier 203 can be connected to a portable sound source such as MP3, CD, and MD players accommodated in the storage case 193. A notch 206 corresponding to the support frame 204 is further provided in the inner end of the case body 194 of the storage case 193 in order to avoid interference of the support frame 204 and the storage case 193 when the storage case 193 is slid between the retracted position and the pulled-out position.

Note that the amplifier 203 may be fixedly arranged within the storage case 193. In such a case, the support frame 204 is not necessary, and the notch 206 provided in the inner end of the case body 194 is not necessary.

In the outer end side of the storage case 193, a projected portion 193a projected inward in the width direction of the vehicle body is provided. In the storage wall 197, a recess portion 197b accommodating the projected portion 193a when the storage case 193 is retracted at the retracted position is formed so as to be opposite to the rear side of the head pipe 27.

A lock mechanism 208 is provided between the storage case 193 and the legshield 158. The lock mechanism 208 can switch between connection and disconnection of the storage case 193 and the legshield 158 according to key operations through a keyhole 207 positioned in the front surface of the storage case 193. This lock mechanism 208 is provided in the projected portion 193a of the storage case 193 so that a cylinder lock 209 operated by key operations through the keyhole 207 is changed between being engaged with the concave portion 197b of the storage wall 197 and being disengaged from the same. The lock mechanism 208 is arranged at the position opposite to the rear side of the head pipe 27.

A handle lock module 211 capable of inhibiting steering operations of the steering handle 26 is arranged near the head pipe 27 on the opposite side to the first article storage section 191. The second article storage section 192 is arranged so as to sandwich the handle lock module 211 between the first and second article storage sections 191 and 192.

Figure 17:
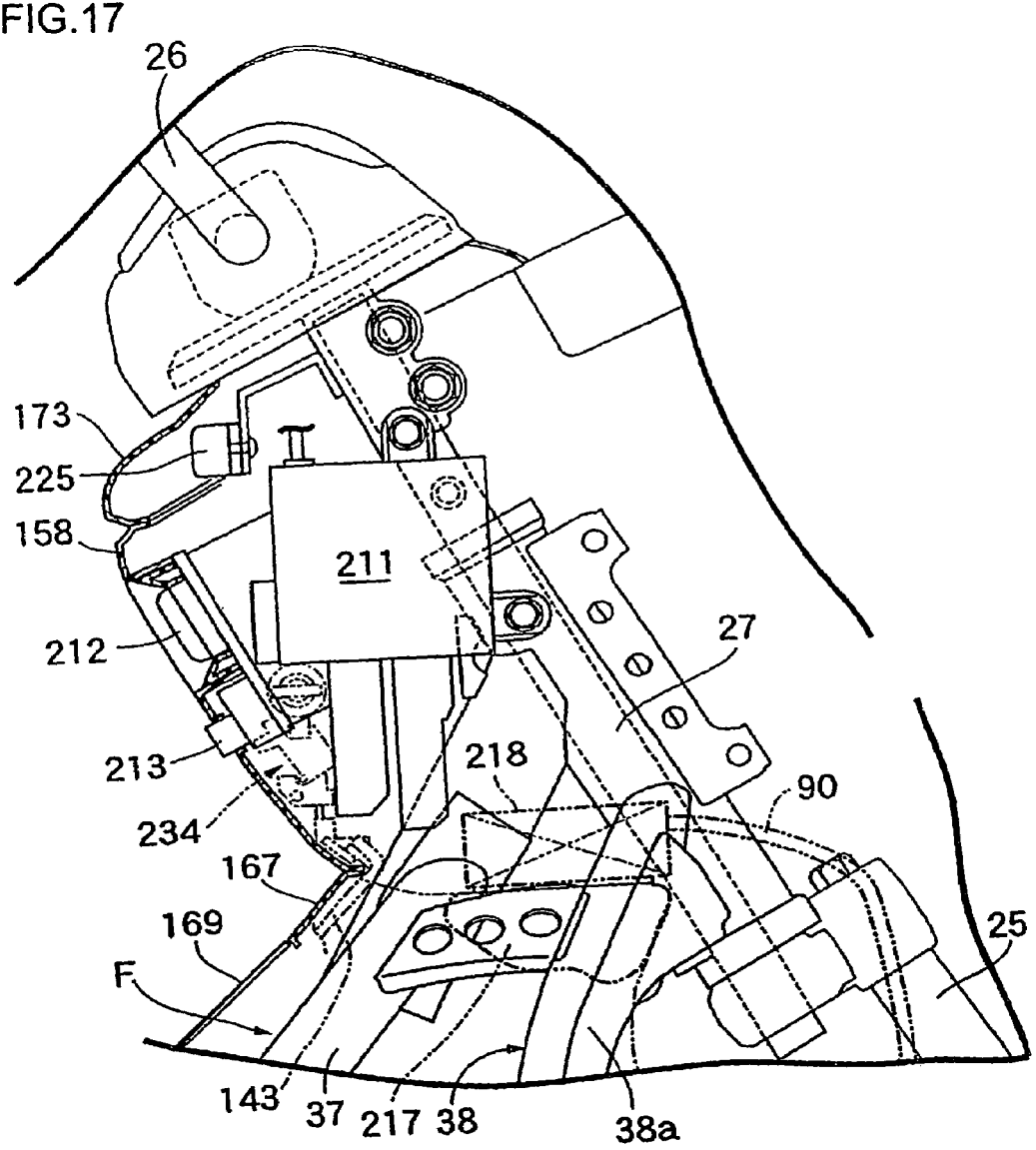
FIG. 17 is a cross-sectional view taken along a line 17-17 of FIG. 13.

In FIG. 17, the handle lock module 211 allows steering operations of the steering handle 26 and allows starting of the engine E according to operations of a knob 212, which is positioned in the back surface of the legshield 158 between the first and second article storage sections 191 and 192, under a predetermined condition. In the back surface of the legshield 158, a seat unlock switch 213 is arranged under this handle lock module 211. The seat unlock switch 213 allows opening operations of the front seat 32 out of the riding seat 31 by being operated under a predetermined condition.

Figure 18:
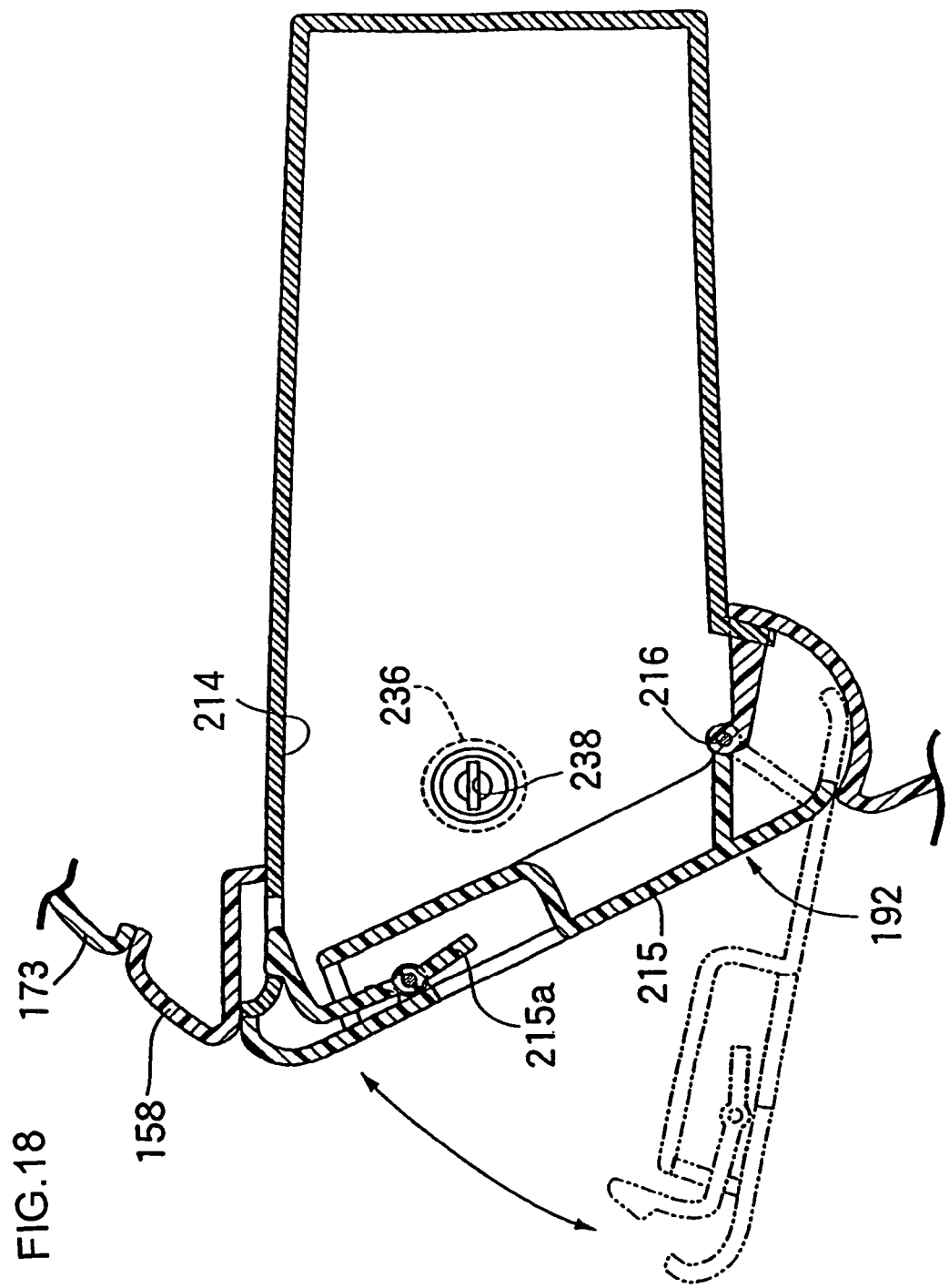
FIG. 18 is a cross-sectional view taken along a line 18-18 of FIG. 13.

In FIG. 18, the second article storage section 192, which is composed of a storage recess portion 214 formed in the legshield 158 and a lid member 215 hinged to the legshield 158, is covered with the lid member 215 so as to open and close the storage recess portion 214. The storage recess portion 214 is formed to be smaller than the storage case 193 of the first article storage section 191 and slightly narrowed toward the front end.

The lid member 215 is hinged to the legshield 158 through a pivot 216 so as to be rotated between an open position and a close position. As indicated by chain double-dashed lines of FIG. 18, the lid member 215 rotates downward and opens the storage recess portion 214 at the open position. As indicated by real lines of FIG. 18, being at the close position, the lid member 215 closes the storage recess portion 214. A lug portion 215a to enable the rotating operation is rotatably attached to the lid member 215.

A shaft of a parking brake lever 217 for operating a brake cable 90 connected to a drum brake 87 of the rear wheel WR is supported by the legshield 158 under the lid member 215 such that the parking brake lever 217 is rotatably operated. The brake cable 90 is extended from a parking brake mechanism 218 operating according to operations of this parking brake lever 217.

Figure 19:
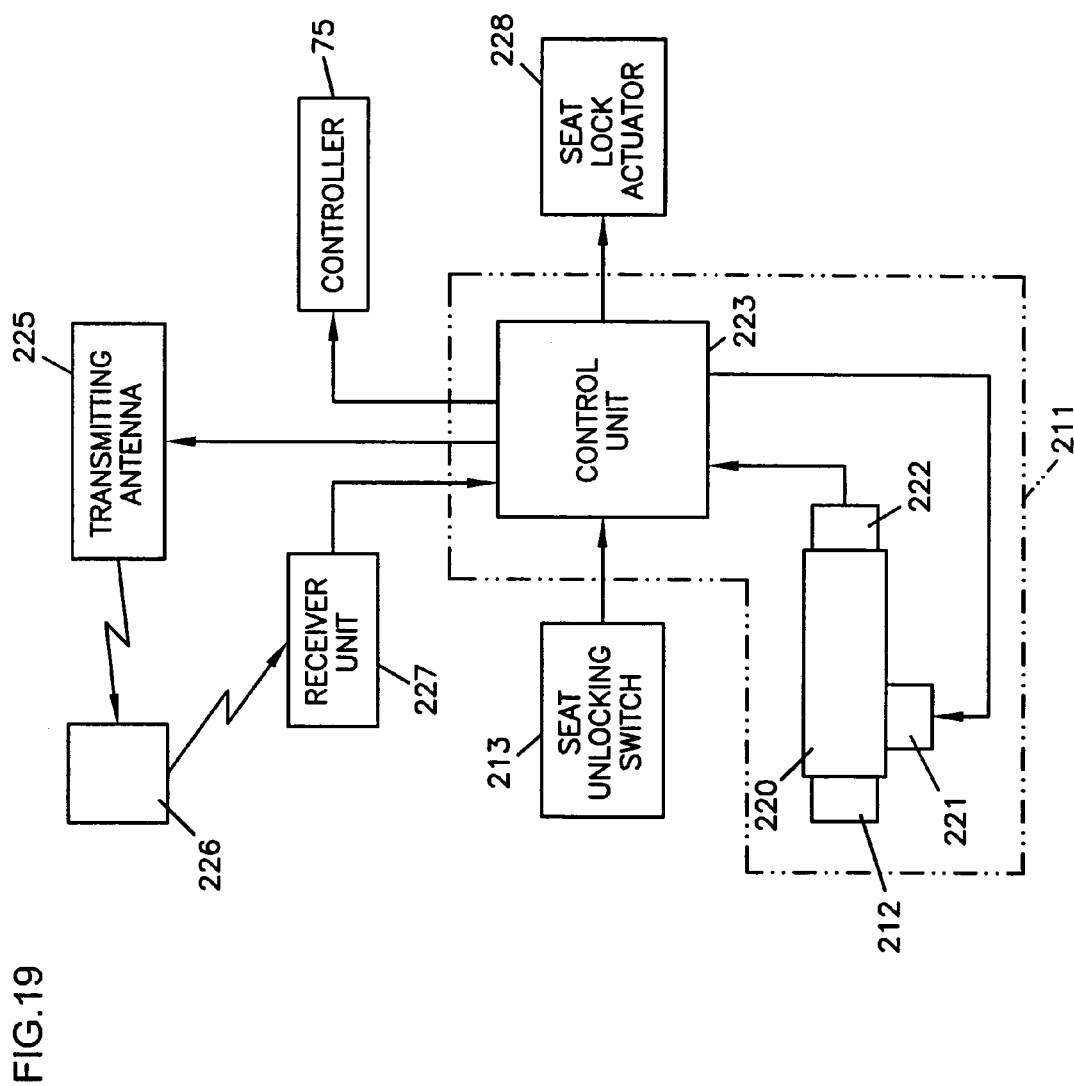
FIG. 19 is a view showing a configuration of a smart entry system.

In FIG. 19, a controller 75 accommodated in the control box 76 attached to the throttle body 68, the handle lock module 211, and the seat unlock switch 213 constitute a part of the smart entry system. The handle lock module 211 includes a cylinder lock 220, a lock solenoid 221, a main switch 222, and a control unit 223. The cylinder lock 220 is rotatably operated with the knob 212 and releases the steering handle 26 locked to the head pipe 27 when the knob 212 is turned. The lock solenoid 221 can inhibit rotation of the cylinder lock 220. The main switch 222 performs switching operations according to the rotation of the cylinder lock 220. Signals are inputted from the main switch 222 to the control unit 223. The lock solenoid 221 is controlled by the control unit 223.

The control unit 223 controls a transmitting antenna 225 so that the transmitting antenna 225 transmits a signal to ask a normal portable transmitter 226 carried by a user of the vehicle to transmit an ID signal. A result of signal reception of a receiving unit 227 which receives a signal from the portable transmitter 226 is inputted into the control unit 223. When identifying the ID signal transmitted from the portable transmitter 226 as a predetermined signal, the control unit 223 causes the lock solenoid 221 to operate to permit operations of the knob 212 to rotate the cylinder lock 220.

When the ID signal transmitted from the portable transmitter 226 is identified as a predetermined signal, the control unit 223 causes a seat lock actuator 228 to operate according to operations of the seat unlock switch 213 and allow the controller 75 to control operations of the engine E according to conduction of the main switch 222.

The receiving unit 227 is arranged within the storage box 30 or the riding seat 31. In this embodiment, a receiving unit accommodating section 110f which is composed of a part of the shallow bottom portion 110c recessed downward is provided within the storage box 30, and the receiving unit 227 is accommodated in the receiving unit accommodating section 110f. In addition, in the shallow bottom portion 110c, the first maintenance lid 117 for maintenance related to the engine E arranged under the storage box 30 is provided so as to be opened and closed. The receiving unit 227 is accommodated in the receiving unit accommodating section 110f so as to be covered with a part of the first maintenance lid 117.

Figure 20:
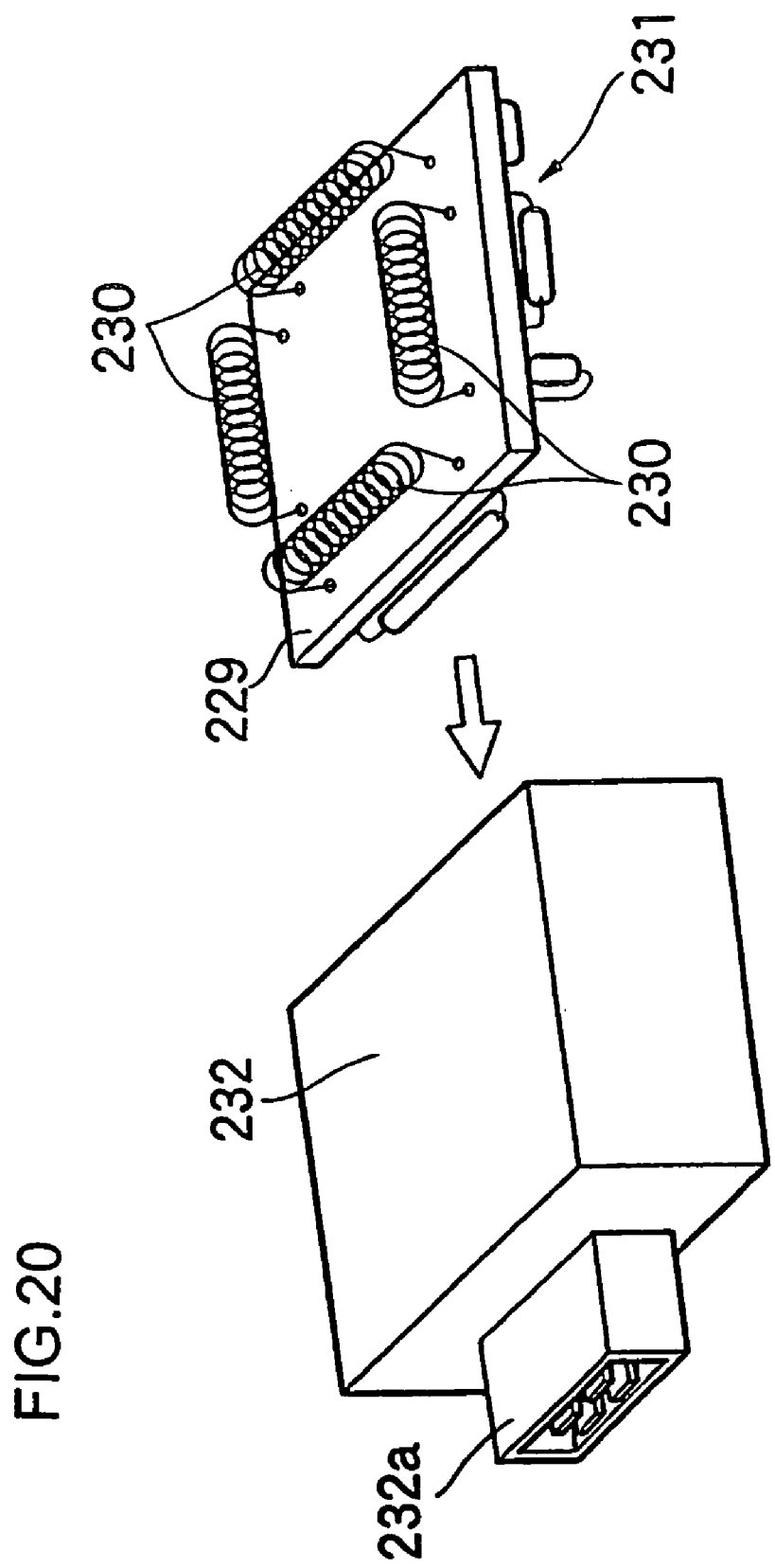
FIG. 20 is an exploded perspective view of a receiving unit.

In FIG. 20, the receiving unit 227 includes a board 229 accommodated within a case 232 integrally provided with a coupler portion 232a, the board including antennas 230, 230 arranged on a side and a receiving circuit 231 on the other side.

On the other hand, a transmitting antenna 225 is arranged at a position spaced from the handle lock module 211. In this embodiment, the transmitting antenna 225 is arranged above the handle lock module 211 on the center line of the vehicle in the width direction, and, for example, arranged directly under the panel 173 constituting a part of the vehicle body cover 34.

Figure 21:
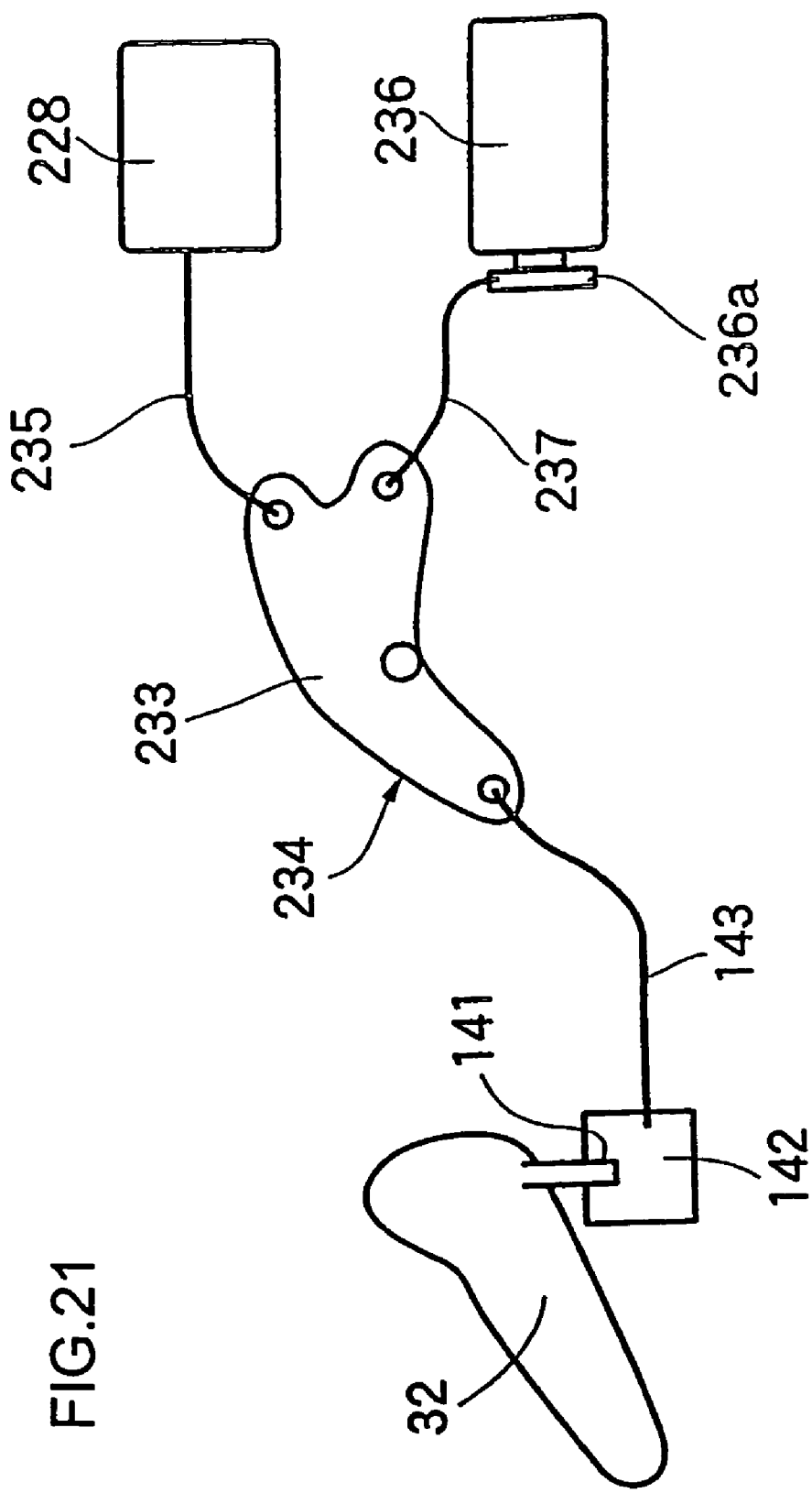
FIG. 21 is a view schematically showing a configuration of an emergency seat lock release system.

In FIG. 21, the driving cable 143 connected to the seat catcher 142 is connected to an end of a link 233 provided for a link mechanism 234. The other end of the link 233 is connected to the seat lock actuator 228 so that the link 233 is rotated with an operation of the seat lock actuator 228 to pull the driving cable 143 through a cable 235.

A keyhole 238 of an emergency-unlock key cylinder lock 236 placed within the legshield 158 is arranged in an inner side surface on the handle lock module 211 side of the storage recess portion 214 of the second article storage section 192. The emergency-unlock key cylinder lock 236 allows at least starting of the engine E and unlocking of the handle without the portable transmitter 226.

The emergency-unlock key cylinder lock 236 includes a rotating lever 236a rotated by operations of an emergency unlock mechanical key inserted into the keyhole 238. This rotating lever 236a is connected to the other end side of the rink 233 through a cable 237.

When the emergency-unlock key cylinder lock 236 is unlocked, the link 233 is rotated to pull the driving cable 143. By either the operation of the seat lock actuator 228 or the unlock operation of the emergency-unlock key cylinder lock 236, the link 233 is rotated to pull the driving cable 143, and the seat catcher 142 is thereby switched from the seat catch state to the seat catch released state.

Upon the seat catcher 142 becoming the seat catch released state, by opening the front seat 32 and by operating a predetermined component arranged within the storage box 30, the control unit 223 is brought into a same control mode as when receiving the ID signal from the normal portable transmitter 226 and allows the scooter-type vehicle to be steered.

Next, a description is given of operations of this embodiment. The rear bulge portion 121 bulged rearward beyond the support pipe 62, that is the portion with which the upper portions of the rear cushions 64 and 64 are attached to the rear end of the rear seat 33 and the rear potion of the vehicle body frame F, is provided in the rear portion of the storage box 30, which includes the front helmet storage section 119 arranged under the front seat 32 provided for the riding seat 31 of tandem type and the rear helmet storage section 120 arranged under the rear seat 33 provided for the riding seat 31. The storage box 30 can be therefore increased in capacity so as to accommodate long objects extending rearward beyond the rear end of the riding seat 31, such as a golf club. In addition, it is possible to accommodate small objects, other than the helmets, in the rear portion of the storage box 30, and it is possible to accommodate objects less frequently used, such as tools, in the rear portion of the storage box 30.

Moreover, the rear bulge portion 121 is bulged rearward to substantially the same position as the rear end of the grab rail 118 arranged around the rear seat 33. Accordingly, the capacity of the storage box 30 can be further increased, and the rear portion of the storage box 30 can be protected by the grab rail 118.

The rear potion of the rear bulge portion 121 is provided with the narrow portion 121a interposed between the right and left tail light units 123, 123 when viewed from the top. The space created between the paired right and left tail light units 123, 123 is effectively utilized, thus increasing the capacity of the storage box 30. It is therefore possible to form a space for changing bulbs of the tail light units 123, 123 easily.

The storage box 30 includes the top surface cover 111 arranged under the rear seat 33. In the upper surface of the top surface cover 111, the storage space 128 available according to detachment of the rear seat 33 is formed. It is therefore possible to secure a space for accommodating small objects, other than the storage box 30, while avoiding an increase in the number of components and a complicated structure. In addition, the storage space 128 is formed within the endlessly continuous first rib 127 stood on the top surface cover 111, and the endlessly continuous second rib 129 is hung down from the bottom plate 33a of the rear seat 33 so as to form a labyrinth structure in cooperation with the first rib 128. It is therefore possible to prevent rain water, dust, and the like from entering the storage space 128 from the surroundings thereof with a simple structure.

In addition, the lighting unit 116 illuminating the inside of the storage box is attached to a portion corresponding to the front portion of the top surface cover 111 in the inner side surface of the storage box 30. The inside of the rear portion of the storage box 30, which is often dark due to the top surface cover 111, can be therefore effectively illuminated without being obstructed by objects accommodated in the rear portion of the storage box 30. Furthermore, in the portion corresponding to the front portion of the top surface cover 111, the inner side surface of the storage box 30 is conspicuous, and burning out of a bulb of the lighting unit 116 and the like can be easily checked.

The rear upper cover 165 and the rear center cover 166, which cover the rear bulge potion 121, the pair of right and left tail light units 123, 123, and the rear fender 181 are attached to the rear bulge portion 121. A plurality of members arranged around the rear portion of the storage box 30 can be therefore detached at once only by disconnecting wiring of the tail light units 123, 123, thus offering excellent maintainability.

The storage box 30 includes the shallow bottom portion 110c arranged between the front and rear helmet storage sections 119 and 120, and the throttle body 68 to which the control box 76 accommodating the controller 75 is annexed and the fuel injection valve 74 are arranged under the shallow bottom portion 110c with the upper ends thereof positioned at a same height. By being formed to be flat, the shallow bottom portion 110c between the front and rear helmet storage sections 119 and 120 can be therefore effectively utilized as storage. Furthermore, in a space under the shallow bottom portion 110c, a part of the intake system of the engine E can be effectively arranged.

The lower portion of the rear bulge portion 121 is arranged below the portions of the upper portions of the rear cushions 64 attached to the rear portion of the vehicle body frame F so that the storage section 124 with the raised portion 110d interposed between the rear helmet storage section 120 and the storage 124 is formed within the rear bulge portion 121. The raised portion 110d is formed of a raised part of the bottom wall of the storage box 30. The rear helmet storage section 120 and the storage section 124 rearward of the rear helmet storage section 120 are separated by the raised portion 110d to improve the usability. Moreover, the raised portion 110d can prevent small objects accommodated in the rear storage section 124 from moving back and forth.

The fuel tank 28, which is formed to be vertically long when viewed from the side, is arranged forward of the storage box 30, and the front bulge portion 122 bulged forward to the vicinity of the bottom portion of the fuel tank 28 is provided in the lower front end portion of the storage box 30. Accordingly, the front portion of the storage box 30 can be formed to be deep, thus facilitating accommodation of long objects and increasing the capacity of the storage box 30.

In addition, the front bulge portion 122 accommodates the battery 147 and the other electric components 148 to 150. The battery 147 and the other electric components 148 to 150 can be therefore accommodated in the storage box 30 without preventing the helmet H1 or the like from being accommodated.

The second maintenance lid 151 which separates the inside of the front bulge portion 122 from the front helmet storage section 119 is attached to the storage box 30 so as to be freely opened and closed. It is therefore possible to prevent articles accommodated within the front bulge portion 122 and the helmet H1 and the like accommodated in the front helmet storage section 119 from coming into contact with each other to be damaged.

The lower portion of the dumper rod 152 vertically extending to assist the front seat 32 in opening and closing is accommodated in the front bulge portion 122. This eliminates the need to secure a space for the dumper rod 152 to be arranged in the outside of the storage box 30. Moreover, it is possible to avoid exposure of the dumper rod 152 to the outside as much as possible while not impeding putting articles into the storage box 30 when the front seat is opened, thus improving the exterior feature and the appearance.

The fuel tank 28 and the radiator 29 are arranged under the floor tunnel portion 167 formed of a part of the vehicle body cover 34 covering the vehicle body frame F. The vehicle body frame F includes the head pipe 27, the pair of right and left upper down frames 37, 37 extending from the head pipe 27 downward and rearward, the pair of right and left lower down frames 38, 38 having the inclined parts 38a, 38a extending downward and rearward from the head pipe 27 below the portions of the upper down frames 37, 37 connected to the head pipe 27. The fuel tank 28 vertically extending from the rear of the lower portion of the head pipe 27 to the lower potions of the both lower down frames 38, 38 is surrounded by the both upper down frames 37, 37 and the both lower down frames 38, 38 and is arranged in a space directly rearward of the front wheel WF.

Arranging the vertically-long fuel tank 28 directly rearward of the front wheel WF prevents a portion corresponding to the lower portion of the head pipe 27 from being wasted and allows a component arrangement effectively using a space under the floor tunnel portion 167. Furthermore, by setting the fuel tank 28, which becomes comparatively heavy, close to the front wheel WF, load distributed on the front wheel WF is increased, and the turning ability can be improved. In the vertically-long fuel tank 28, the height of the remaining fuel is comparatively high in a state where a small amount of fuel remains. The fuel tank 28 is therefore advantageous in sucking of the pump in the case where the pump unit 97 is annexed to the fuel tank 28 like this embodiment.

The radiator 29 is arranged rearward of the fuel tank 28, and the battery 147 is arranged between the radiator 29 and the fuel tank 28. By designing the fuel tank 28 to be vertically long, a space rearward of the fuel tank 28 can be set comparatively large. Moreover, the battery 147, which is a heavy object, can be arranged in the center of the vehicle body in the fore-and-aft direction, thus contributing to improved drivability. Moreover, arranging the battery 147 between the radiator 29 radiating heat and the fuel tank 28 can prevent the fuel tank 28 from being affected by heat from the radiator 29.

The pump unit 97 accommodated and arranged in the lower portion of the fuel tank 28 is attached to the fuel tank 28 from the back side of the fuel tank 28. Accordingly, the pump unit 97 can be attached to the fuel tank 28 so as not to be affected by uneven road surfaces.

The pump unit 97 is attached to the fuel tank 28 in a posture with a rotation axis thereof sloped down toward the front. Accordingly, a suction inlet of the pump unit 97 is brought to the bottom portion of the fuel tank 28 as close as possible, and the amount of unused fuel within the fuel tank 28 can be reduced as much as possible.

The reservoir tank 104 of the radiator 29 is arranged under the step floors 159 and 159 constituting a part of the vehicle body cover 34, and the water intake of the reservoir tank 104 is arranged under the first maintenance lid 117 detachably attached to the bottom wall of the storage box 30, which is arranged under the riding seat 31. By arranging the radiator 29 in rearward of the fuel tank 28, the water intake 107 of the radiator tank 104 can be easily faced to the bottom portion of the riding seat 31 and is arranged at a position higher than that when faced to the step floor 159 or the like directly above the reservoir tank 104, thus offering good workability in water supply.

The water intake forming member 108 forming the water intake 107 is supported to the vehicle body frame F by the attachment portion 54 of the tension rod 53, which is provided between the vehicle body frame F and the unit swing engine UE swingably supported by the vehicle body frame F. The water intake forming member 108 can be supported on the vehicle body frame F without any special device for supporting the water intake forming member 108.

Fuel from the fuel tank 28 is fed to the fuel injection valve 74. Using the pump unit 97 energized by the fuel tank 28, in which the height of remaining fuel is comparatively high in a state where the amount of remaining fuel is small, the fuel within the fuel tank 28 can be effectively fed to the fuel injection valve 74.

The swingarm 48, which is arranged to the right of the rear wheel WR and supports the rear wheel WR, is formed into a substantially triangular shape when viewed from the side, and the brake caliper 85 of the rear brake 84 is supported by the swingarm 48. In the substantially center portion of the swingarm 48, the opening portion 81 is provided, and the brake caliper 85 is arranged within the opening portion 81. The brake caliper 85 can be therefore arranged at a comparatively low position, thus lowering the center of gravity of the scooter-type vehicle. Moreover, since the brake caliper 85 is surrounded by the swingarm 48, the substantial vertical width of the swingarm 48 when viewed from the side can be secured, and vertical and torsional rigidities thereof can be increased.

The exhaust muffler 78 is arranged on the outside of the swingarm 48 so as to cover the brake caliper 85 from the outside, thus improving the exterior feature.

The opening portion 81 is formed such that the vertical width thereof is narrowed toward the rear, and the brake caliper 85 arranged in the rear portion of the opening 81 is supported by the swingarm 48 rearward of the opening portion 81. The brake caliper 85 is thus supported by a portion with high rigidity in the swingarm 48, and the attachment strength of the brake caliper 85 can be increased.

The lower portion of the exhaust muffler 78 is fastened to the swingarm 48 at two places sandwiching the axle 80 of the rear wheel WR on both front and rear sides. The axle 80 and the portion with which the rear cushion 64 provided between the swingarm 48 and the vehicle body frame F is fastened to the swingarm 48 are arranged between the straight line L connecting the fastening portions of the exhaust muffler 78 and the exhaust muffler 78. This facilitates an assembly of the exhaust muffler 78 and the rear cushion 64 to the swingarm 48. Moreover, the axle 80 and the fastening portions are made hard to see from laterally above the scooter-type vehicle, thus improving the exterior feature.

The electric motor 42, which is provided between the engine E and the rear wheel WR and changes the gear ratio of the continuously variable transmission M, is arranged under the passenger step 162 which is provided in the rear portion of the step floor 159 provided for the vehicle body cover 34. The arrangement of the electric motor 42 at the comparatively low position can contribute lowering of the center of gravity of the scooter-type vehicle.

The continuously variable transmission M is a belt type and constitutes the unit swing engine UE together with the engine E. Here the axis of the cylinder 45 of the engine E set substantially horizontal. The electric motor 42 is arranged forward of the continuously variable transmission M in the side of the cylinder 45. The electric motor 42 can be thus protected by the cylinder 45 of the engine E and the continuously variable transmission M. In addition, the support frame 41 supporting the step floor 159 from below is provided in the vehicle body frame F. Since the electric motor 42 is arranged below the support frame 41, the electric motor 42 can be effectively protected by the highly rigid support frame 41.

Furthermore, the electric motor 42 is arranged with the rotational axis thereof directed in the vehicle body width direction. The electric motor 42 can be therefore arranged in the lateral side of the cylinder 45 provided with the engine E so as not to protrude outward beyond the outer surface of the continuously variable transmission M.

The grab rail 118 is attached to the rear portion of the vehicle body frame F, and the backrest 135, which includes the front inclined surface 135a and the rear inclined surface 135b in the upper surface to be formed into a substantially streamlined shape when viewed from the side and is attached to the upper surface of the rear portion of the grab rail 118, is arranged rearward of the rear seat 33 provided for the riding seat 31.

Therefore, the lower back of the passenger on the rear seat 33 can be firmly held with the front inclined surface 135a, which is sloped down toward the front in the upper surface of the backrest 135. Moreover, since the backrest 135 has a substantially streamlined shape when viewed from the side, the exterior feature of the backrest 135 can be improved, and the aerodynamic performance can be increased. Since the rear inclined surface 135b sloped down toward the rear can be utilized in the upper surface of the backrest 135, it is possible to put loads protruding rearward from the rear seat 33 on the backrest 135.

The backrest 135 is formed such that the width thereof is gradually narrowed toward the rear when viewed from the top. Accordingly, the backrest 135 can be downsized, thus securing the unity of design in combination with the shape of the vehicle body cover 34 and further increasing the aerodynamic performance.

The upper surface of the rear portion of the grab rail 118 is set to a substantially same height as the upper surface of the rear seat 33, and the backrest 135 is detachably attached to the upper surface of the rear portion of the grab rail 118. When more loads are desired to be put on the rear seat 33, the loads can be put by effectively using the upper surface of the rear portion of the grab rail 118 after the backrest 135 is detached.

In the legshield 158 provided for the vehicle body cover 34, the first article storage section 191 and the second article storage section 192 are separately arranged right and left. The first article storage section 191 includes the storage case 193 which is capable of being pulled out and removed from the legshield 158 and is thus configured as a pullout type. The second article storage section 192 includes the storage recess portion 214 which is formed in the legshield 158 and covered with the lid member 215 so as to be freely opened and closed. Herein, the lid member 215 is hinged to the legshield 158. It is therefore possible to effectively use a comparatively large space of the legshield 158 and accommodate articles in the legshield 158. In addition, the storage case 193 is formed to be larger than the storage recess portion 214, and the first article storage section 191 can accommodate a comparatively large amount of articles. Since the first article storage section 191 is the pullout type, articles within the storage case 193 do not come out, and it is possible to accommodate articles fully within the storage case 193. When the storage case 193 is removed from the legshield 158, the comparatively large opening portion 196 can be opened in the legshield 158 and thus facilitates the maintenance of the bulbs 171a of the headlight 171 and the like arranged forward of the first article storage section 191.

The lock mechanism 208 is provided between the storage case 193 of the first article storage section 191 and the legshield 158. The lock mechanism 208 can switch between connection and disconnection of the storage case 193 and the legshield 158 according to key operations through the keyhole 207 positioned in the front surface of the storage case 193. The storage case 193 can be pulled by inserting the key into the keyhole 207 of the lock mechanism 208 and operating the same. It is then possible to prevent articles accommodated in the first article storage section 191 from being stolen. Moreover, the storage case 193 can be pulled out with the key as a grip, thus eliminating the need for the grip to be provided in the storage case 193. The first article storage section 191 can therefore accommodate more articles.

The storage case 193 is formed so as to cover the head pipe 27 from one side of the right and left in the retracted state, and the lock mechanism 208 is arranged at a position opposite to the head pipe 27 in the rear of the head pipe 27. Accordingly, the accommodation capacity of the storage case 193 is set further increased by effectively arranging the lock mechanism 208 in a space rearward of the head pipe 27.

In the opposite side to the first article storage section 191 in the vicinity of the head pipe 27, the handle lock module 211 capable of inhibiting steering operations of the steering handle 26 is arranged, and the second article storage section 192 is arranged so as to sandwich the handle lock module 211 between the first and second article storage sections 191 and 192. Accordingly, by arranging the first article storage section 191, the handle lock module 211, and the second article storage section 192 in the legshield 158 side by side, the comparatively large space of the legshield 158 can be more effectively used.

The transmitting antenna 225 is arranged at a position spaced from the handle lock module 211, thus increasing the degree of freedom of the arrangement of the transmitting antenna 225.

The receiving unit 227 is arranged within the storage box 30 or within the riding seat 31. In this embodiment, the receiving unit 227 is arranged within the storage box 30, therefore the arrangement eliminates the need for the receiving unit 227 to be coated with a coating material made of synthetic resin and enables the receiving unit 227 to ensure the environment resistance related to mud, dust, water, external force, and the like. Accordingly, it is possible to eliminate readjustment of the receiving unit 227 and ensure the waterproof property.

The receiving unit 227 includes the board 229 accommodated within the case 232, and here the board is including the antennas 230 and 230 arranged on a side and the receiving circuit 231 on the other side. Accordingly, the receiving unit 227 can be structured to be compact, and a space necessary for the receiving unit 227 within the storage box 30 is set as small as possible.

In addition, the first maintenance lid 117 for maintenance related to the engine E arranged under the storage box 30 is provided in the bottom wall of the storage box 30 so as to be freely opened and closed, and the receiving unit 227 is arranged within the storage box 30 so as to be covered with part of the first maintenance lid 117. Accordingly, the receiving unit 227 can be arranged at a position suitable for maintenance while being prevented from interfering with articles accommodated within the storage box 30.

The emergency-unlock key cylinder lock 236, which allows at least starting of the engine E and unlocking of the handle without the portable transmitter 226, is arranged within the legshield 158. Even when the vehicle user loses the portable transmitter 226 or the battery of the portable transmitter 226 runs out, the scooter-type vehicle can be moved by operating the emergency unlocking key cylinder lock 236 with a mechanical key for emergency unlock.

In the right side of the handle lock module 211 in the legshield 158, the second article storage section 192 is provided. The keyhole 238 of the emergency unlocking key cylinder lock 236 is provided in the inner side surface of the storage recess portion 214 of the second article storage section 192. The storage recess portion 214 is usually closed with the lid member 215. Accordingly, it is possible to arrange the keyhole 238 at a hard-to-spot position and prevents mischief for the keyhole 238 of the emergency unlocking key cylinder lock 236 as much as possible.

The link mechanism 234 connected to the seat catcher 142 is connected to the seat lock actuator 228 operating according to operations upon reception of signals from the normal portable transmitter 226 and also connected to the emergency unlocking key cylinder lock 236. The seat catcher 142 switches between the seat catch state holding the front seat 32 closed, unless otherwise the storage box 30 may be opened, and the seat catch released state allowing the opening and closing operations of the front seat 32. The link mechanism 234 causing the seat catcher 142 to operate is designed to be used both in the case where the portable transmitter 226 is effective and in the case where the emergency unlocking key cylinder lock 236 is used, in order to reduce the number of components.

Hereinabove, a description has been given of the embodiment of the present invention. However, the present invention is not limited to the aforementioned embodiment, and various design modifications can be made without departing from the present invention described in claims.

We claim:

1. An article storage structure for a scooter-type vehicle, capable of accommodating articles in a legshield covering a head pipe from the rear side, the head pipe steerably supporting a front wheel and a steering handle, the article storage structure comprising:

a first article storage section and a second article storage section separately placed within left and right sides of the legshield, wherein the first article storage section includes a storage case capable of being pulled out and removed from the legshield to be configured as a pullout type, the second article storage section including a storage recess portion formed in the legshield and covered with a lid member to be freely opened and closed, the lid member being hinged to the legshield, and the storage case is formed to be larger than the storage recess portion, wherein a lock mechanism is provided between the storage case of the first article storage section and the legshield, the lock mechanism being capable of switching between connection and disconnection of the storage case and the legshield according to a key operation from a keyhole positioned in an outer end of the storage case, and wherein the storage case is formed to cover a portion of the head pipe from one of right and left sides when retracted, and the lock mechanism is arranged at a position opposite to the rear side of the head pipe.

2. An article storage structure for a scooter-type vehicle, capable of accommodating articles in a legshield covering a head pipe from the rear side, the head pipe steerably supporting a front wheel and a steering handle, the ankle storage structure comprising:

a first article storage section and a second article storage section separately placed within left and right sides of the legshield, wherein the first article storage section includes a storage case capable of being pulled out and removed from the legshield to be configured as a pullout type, the second article storage section including a storage recess portion formed in the legshield and covered with a lid member to be freely opened and closed, the lid member being hinged to the legshield, and the storage case is formed to be larger than the storage recess portion, and wherein a lock mechanism is provided between the storage case of the first article storage section and the legshield, the lock mechanism being arranged at a position opposite to the rear side of the head pipe.

3. An article storage structure for a scooter-type vehicle; capable of accommodating articles in a legshield covering a head pipe from the rear side, the head pipe steerably supporting a front wheel and a steering handle, the article storage structure comprising:

a first article storage section and a second article storage section separately placed within left and right sides of the legshield, wherein the first article storage section includes a storage case capable of being pulled out and removed from the legshield to be configured as a pullout type, the second article storage section including a storage recess portion formed in the legshield and covered with a lid member to be freely opened and closed, the lid member being hinged to the legshield, and the storage case is formed to be larger than the storage recess portion, and wherein a handle lock module capable of inhibiting a steering operation of the steering handle is arranged on an opposite side to the first article storage section in the vicinity of the head pipe, and the second article storage section is arranged so that the handle lock module is sandwiched between the first article storage section and the second article storage section.

* * * * *